United States Patent
Koh et al.

(10) Patent No.: US 10,210,516 B2
(45) Date of Patent: Feb. 19, 2019

(54) MOBILE DEVICES FOR COMMERCE OVER UNSECURED NETWORKS

(71) Applicant: RFCyber Corporation, Fremont, CA (US)

(72) Inventors: Liang Seng Koh, Fremont, CA (US); Hsin Pan, Fremont, CA (US); Xiangzhen Xie, Shenzhen (CN)

(73) Assignee: RFCyber Corp., Fremont, CA (US)

( * ) Notice: Subject to any disclaimer, the term of this patent is extended or adjusted under 35 U.S.C. 154(b) by 0 days.

(21) Appl. No.: 15/000,041

(22) Filed: Jan. 19, 2016

(65) Prior Publication Data

US 2016/0275504 A1    Sep. 22, 2016

Related U.S. Application Data

(63) Continuation of application No. 13/350,835, filed on Jan. 16, 2012, now Pat. No. 9,240,009, which is a
(Continued)

(51) Int. Cl.
*G06Q 20/00* (2012.01)
*G06Q 20/40* (2012.01)
(Continued)

(52) U.S. Cl.
CPC ......... *G06Q 20/401* (2013.01); *G06Q 20/325* (2013.01); *G06Q 20/352* (2013.01); *G06Q 20/3552* (2013.01); *G06Q 20/3672* (2013.01); *G06Q 30/0601* (2013.01); *H04L 67/141* (2013.01); *G06Q 20/32* (2013.01); *G06Q 20/322* (2013.01); *G06Q 20/3227* (2013.01); *G06Q 20/3278* (2013.01); *G06Q 20/341* (2013.01); *G06Q 20/367* (2013.01); *G06Q 20/3674* (2013.01); *G06Q 20/40* (2013.01)

(58) Field of Classification Search
CPC ...... G06Q 20/32; G06Q 20/40; G06Q 20/322; G06Q 20/3278; G06Q 20/341; G06Q 20/367; G06Q 20/3674; G06Q 20/3227; G06Q 20/3672; G06Q 20/401; G06Q 20/20; G06Q 20/352; G06Q 20/3552; G06Q 20/382; G06Q 20/3821
See application file for complete search history.

(56) References Cited

U.S. PATENT DOCUMENTS

2005/0187873 A1 * 8/2005 Labrou ................. G06Q 20/02
                                                    705/40
2006/0080322 A1 * 4/2006 Akashika ............. G06Q 20/327
(Continued)

FOREIGN PATENT DOCUMENTS

FR           2892261 A1 *  4/2007  ........ H04M 1/72522

*Primary Examiner* — Christopher Stanford
(74) *Attorney, Agent, or Firm* — Joe Zheng

(57) ABSTRACT

Techniques for managing modules or applications installed in a mobile device are described. To provide authentic and secured transactions with another device, each of the installed applications is provisioned with a server through data communication capability in a mobile device. A provisioned application is associated with the personalized secure element in the mobile device and works with a set of keys that are generated in accordance with a set of keys from the personalized secure element. Further management of controlling an installed application is also described.

20 Claims, 25 Drawing Sheets

Related U.S. Application Data continuation-in-part of application No. 11/534,653, filed on Sep. 24, 2006, now Pat. No. 8,118,218, and a continuation-in-part of application No. 11/739,044, filed on Apr. 23, 2007, which is a continuation-in-part of application No. 11/534,653, filed on Sep. 24, 2006, now Pat. No. 8,118,218.

(51) Int. Cl.
*G06Q 20/34* (2012.01)
*G06Q 20/36* (2012.01)
*G06Q 30/06* (2012.01)
*H04L 29/08* (2006.01)
*G06Q 20/32* (2012.01)

(56) References Cited

U.S. PATENT DOCUMENTS

| | | | |
|---|---|---|---|
| 2006/0165060 A1* | 7/2006 | Dua | G06Q 20/20 370/352 |
| 2006/0224901 A1* | 10/2006 | Lowe | H04L 63/062 713/186 |
| 2007/0145135 A1* | 6/2007 | Jogand-Coulomb | G06K 7/10237 235/451 |
| 2007/0145152 A1* | 6/2007 | Jogand-Coulomb | G06K 7/10237 235/492 |
| 2009/0215489 A1* | 8/2009 | Kerdraon | H04M 1/72522 455/558 |

\* cited by examiner

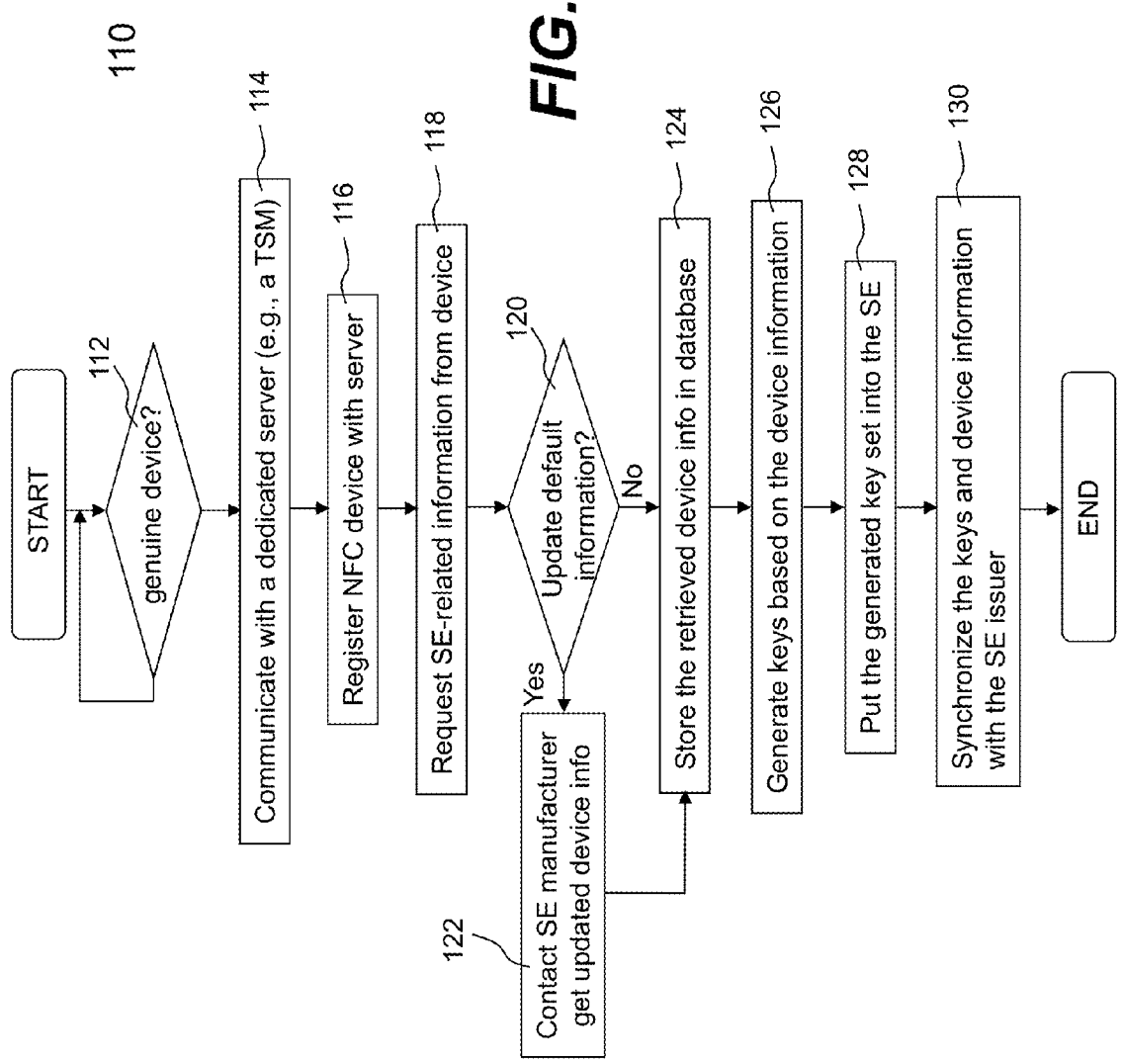

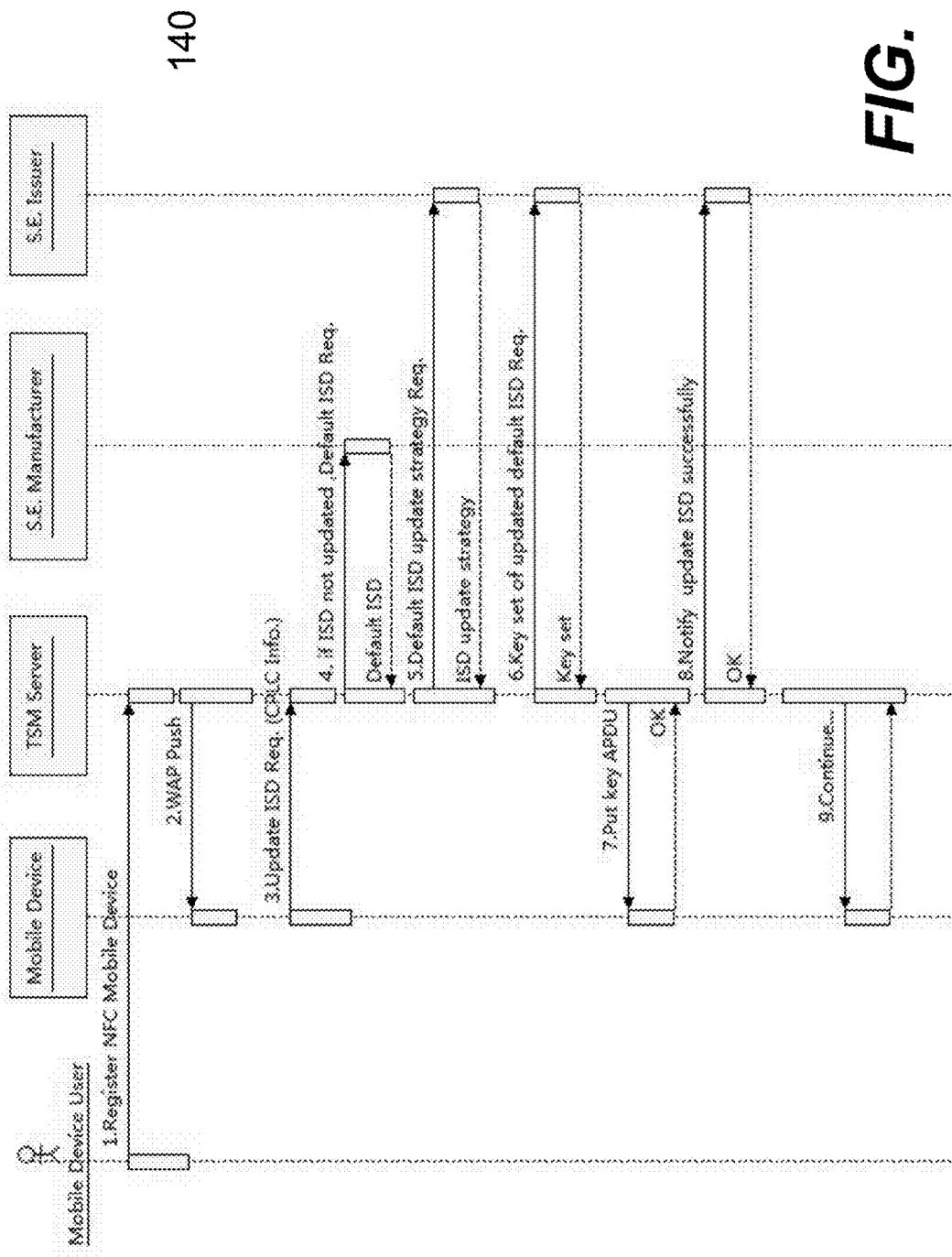

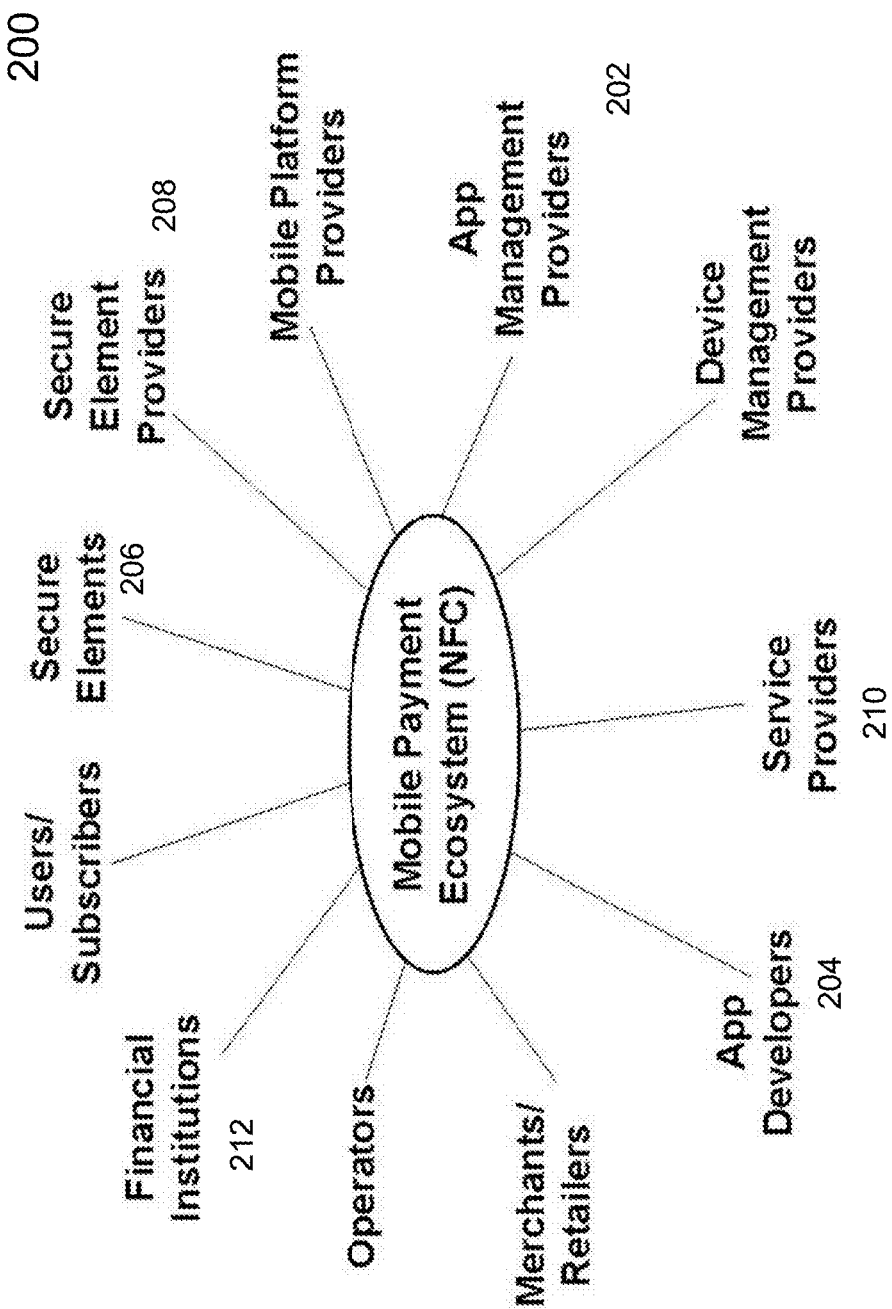

MOBILE DEVICES FOR COMMERCE OVER UNSECURED NETWORKS

CROSS-REFERENCE TO RELATED APPLICATIONS

This application is continuation of U.S. patent application Ser. No. 13/350,835 filed on Jan. 16, 2012, now U.S. Pat. No. 9,240,009, which is a continuation-in-part of co-pending U.S. patent application Ser. No. 11/534,653 filed on Sep. 24, 2006, now U.S. Pat. No. 8,118,218, and also a continuation-in-part of U.S. patent application Ser. No. 11/739,044 filed on Apr. 23, 2007, which is a continuation-in-part of co-pending U.S. patent application Ser. No. 11/534,653 filed on Sep. 24, 2006, now U.S. Pat. No. 8,118,218.

BACKGROUND

Technical Field

The present invention is generally related to commerce over networks. Particularly, the present invention is related to techniques for personalizing a secure element and provisioning an application such as an electronic purse that can be advantageously used in portable devices configured for both electronic commerce (a.k.a., e-commerce) and mobile commerce (a.k.a., m-commerce).

Description of the Related Art

Single functional cards have been successfully used in enclosed environments such as transportation systems. One example of such single functional cards is MIFARE that has been selected as the most successful contactless smart card technology. MIFARE is the perfect solution for applications like loyalty and vending cards, road tolling, city cards, access control and gaming.

However, single functional card applications are deployed in enclosed systems, which are difficult to be expanded into other areas such as e-commerce and m-commerce because stored values and transaction information are stored in data storage of each tag that is protected by a set of keys. The nature of the tag is that the keys need to be delivered to the card for authentication before any data can be accessed during a transaction. This constraint makes systems using such technology difficult to be expanded to an open environment such as the Internet for e-commerce and/or wireless networks for m-commerce as the delivery of keys over a public domain network causes security concerns.

In general, a smart card, chip card, or integrated circuit card (ICC), is any pocket-sized card with embedded integrated circuits. A smart card or microprocessor cards contain volatile memory and microprocessor components. Smart cards may also provide strong security authentication for single sign-on (SSO) within large organizations. The benefits of smart cards are directly related to the volume of information and applications that are programmed for use on a card. A single contact/contactless smart card can be programmed with multiple banking credentials, medical entitlement, driver's license/public transport entitlement, loyalty programs and club memberships to name just a few. Multi-factor and proximity authentication can and has been embedded into smart cards to increase the security of all services on the card.

Contactless smart cards that do not require physical contact between card and reader are becoming increasingly popular for payment and ticketing applications such as mass transit and highway tolls. Such Near Field Communication (NFC) between a contactless smart card and a reader presents significant business opportunities when used in NFC-enabled mobile phones for applications such as payment, transport ticketing, loyalty, physical access control, and other exciting new services.

To support this fast evolving business environment, several entities including financial institutions, manufactures of various NFC-enabled mobile phones and software developers, in addition to mobile network operators (MNO), become involved in the NFC mobile ecosystem. By nature of their individual roles, these players need to communicate with each other and exchange messages in a reliable and interoperable way.

One of the concerns in the NFC mobile ecosystem is its security in an open network. Thus there is a need to provide techniques to personalize a secure element in a contactless smart card or an NFC-enabled mobile device so that such a device is so secured and personalized when it comes to financial applications or secure transactions. With a personalized secure element in an NFC-enabled mobile device, various applications or services, such as electronic purse or payments, can be realized. Accordingly, there is another need for techniques to provision or manage an application or service in connection with a personalized secure element.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention is related to techniques for personalizing secure elements in NFC devices to enable various secure transactions over a network (wired and/or wireless network). With a personalized secure element (hence secured element), techniques for provisioning various applications or services are also provided. Interactions among different parties are managed to effectuate a personalization or provisioning process flawlessly to enable an NFC device for a user thereof to start enjoying the convenience of commerce over a data network with minimum effort.

As an example of application to be provided over a secured element, a mechanism is provided to enable devices, especially portable devices, to function as an electronic purse (e-purse) to conduct transactions over an open network with a payment server without compromising security. According to one embodiment, a device is installed with an e-purse manager (i.e., an application). The e-purse manager is configured to manage various transactions and functions as a mechanism to access an emulator therein. Secured financial transactions can then be conducted over a wired network, a wireless network or a combination of both wired and wireless network.

According to another aspect of the present invention, security keys (either symmetric or asymmetric) are personalized so as to personalize an e-purse and perform a secured transaction with a payment server. In one embodiment, the essential data to be personalized into an e-purse include one or more operation keys (e.g., a load key and a purchase key), default PINs, administration keys (e.g., an unblock PIN key and a reload PIN key), and passwords (e.g., from Mifare). During a transaction, the security keys are used to establish a secured channel between an embedded e-purse and an SAM (Security Authentication Module) or a backend server.

The present invention may be implemented in various forms including a method, a system, an apparatus, a part of a system or a computer readable medium. According to one embodiment, the present invention is a method for personalizing a secure element associated with a computing device. The method comprises initiating data communication with a server, sending device information of the secure element in responding to a request from the server after the server determines that the secure element is registered therewith, wherein the device information is a sequence of characters uniquely identifying the secure element, and the request is a command causing the computing device to retrieve the device information from the secure element, receiving at least a set of keys from the server, wherein the keys are generated in the server in accordance with the device information of the secure element, and storing the set of keys in the secure element to facilitate a subsequent transaction by the computing device.

According to another embodiment, the present invention is a method for personalizing a secure element associated with a computing device. The method comprises receiving an inquiry to establish data communication between a server and the computing device, sending a request from the server to the computing device to request device information of the secure element after the server determines that the computing device is registered therewith, wherein the device information is a sequence of characters uniquely identifying the secure element, and the request is a command that subsequently causes the computing device to retrieve the device information from the secure element therein, generating at least a set of keys in accordance with the device information received, delivering the set of keys through a secured channel over a data network to the computing device, wherein the set of keys is caused to be stored in the secure element with the computing device, and notifying at least a related party that the secure element is now personalized for subsequent trusted transactions.

According to still another embodiment, the present invention is a method for provisioning an application installed in a mobile device, the method comprises sending to a server an identifier identifying the application together with device information of a secure element associated with a mobile device on which the application has been installed, establishing a secured channel between the secure element and the server using a set of key set installed in the secure element, receiving data prepared by the server to enable the application to function as designed on the mobile device; and sending out an acknowledgement to a provider of the application about a status of the application now being active with the secure element on the mobile device. The data received in the mobile device includes a user interface of the application per the mobile device and a generated application key set.

According to still another embodiment, the present invention is a method for provisioning an application, the method comprises receiving from a mobile device an identifier identifying the application together with device information of a secure element associated with the mobile device on which the application has been installed, establishing a secured channel between the secure element and the server using a set of key set installed on the secure element, preparing data necessary for the application to function as designed on the mobile device, transporting the data from the server to enable the application via the secured channel; and notifying a provider of the application about a status of the application now active with the secure element on the mobile device.

According to yet another embodiment, the present invention is a mobile device for conducting a transaction over a network, the mobile device comprises a network interface, a secure element, a memory space for storing at least a module and an application downloaded from the network, a processor coupled to the memory space and configured to execute the module to cause operations including verifying whether the application has been provisioned. When it is verified that the application has not been provisioned, the operations further comprise sending to a server via the network interface an identifier identifying the application together with device information of a secure element, establishing a secured channel between the secure element and the server using a key set installed on the secure element, wherein the server is configured to prepare data necessary for the application to function as designed on the mobile device, receiving the data from the server to associate the application with the secure element, and sending out an acknowledgement to a provider of the application about a status of the application that is now active with the secure element. The processor is further configured to determine if the secure element has been personalized before performing a provisioning process of the application. If the secure element has not been personalized, the mobile device is caused to personalize the secure element with a designed server.

One of the objects, features, and advantages of the present invention is to enable a mobile device that can be used to perform a secured transaction with a party (e.g., at a point of sale, with a commercial server or accessing remotely) over an unsecured network (e.g., the Internet).

Other objects, features, and advantages of the present invention, which will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1B shows a flowchart or process of personalizing an SE according to one embodiment of the present invention;

FIG. 1D illustrates data flows among a user for an NFC device (e.g., an NFC mobile phone), the NFC device itself, a TSM server, a corresponding SE manufacturer and an SE issuer;

FIG. 2A shows a mobile payment ecosystem in which related parties are shown in order for the mobile payment ecosystem successful;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 1A-7. However, those skilled in the art will readily appreciate that the detailed description given herein with respect to these figures is for explanatory purposes only as the invention extends beyond these limited embodiments.

Near Field Communication (NFC) presents significant business opportunities when used in mobile phones for applications such as payment, transport ticketing, loyalty, physical access control, and other exciting new services. To support this fast evolving business environment, several entities including financial institutions, manufactures of various NFC-enabled mobile phones and software developers, in addition to Mobile Network Operators (MNO), become involved in the NFC mobile ecosystem. By nature of their individual roles, these players need to communicate with each other and exchange messages in a reliable and interoperable way.

Equally important to these entities or players, is the need for ongoing security and confidentiality of sensitive applications and data downloaded to and stored on an NFC enabled handset for performing contactless transactions. The component in a mobile phone providing the security and confidentiality required to support various business models in this environment, is referred to as a Secure Element (SE).

Figure 1A:
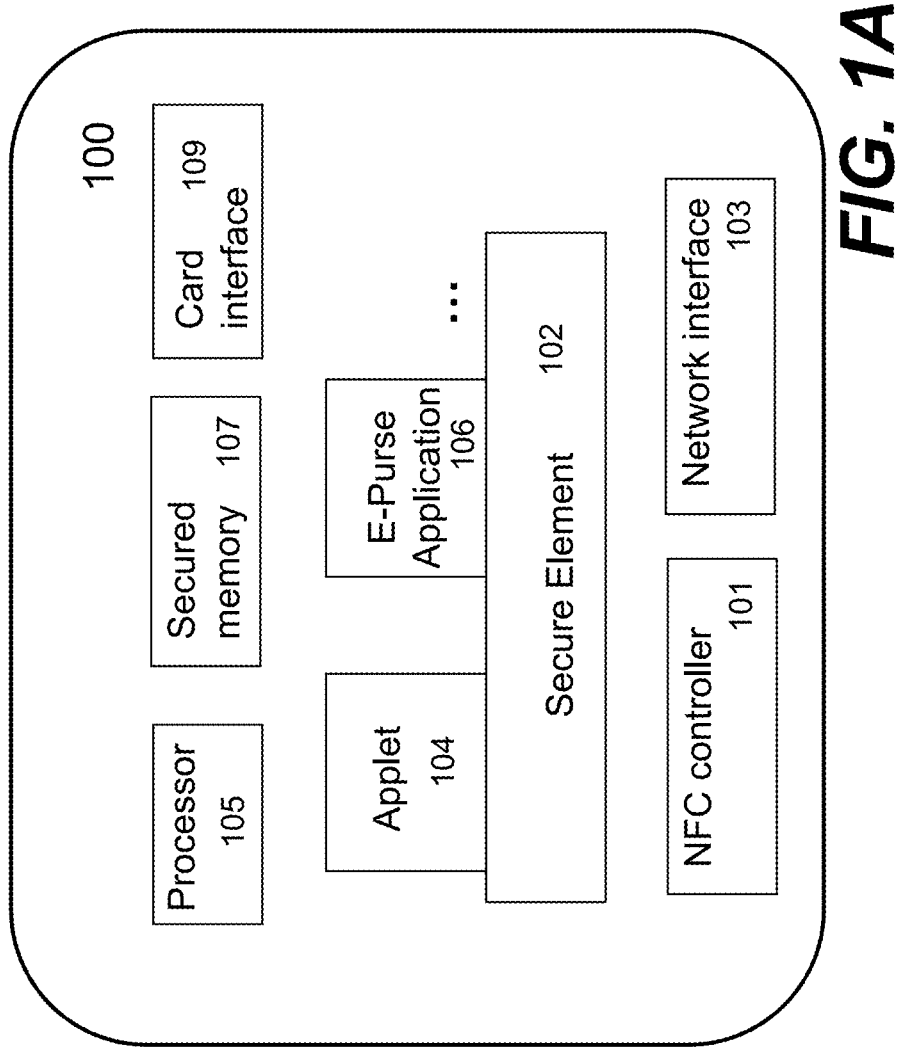
FIG. 1A shows a simplified architecture of an NFC-enabled mobile device with a secure element (SE)

FIG. 1A shows a simplified architecture of a computing device 100. Unless otherwise explicitly indicated, the term of "computing device", "mobile device" or "handset" will be interchangeably used herein, but those skilled in the art will understand the description herein shall be equally applicable to other devices such as a smart phone, a tablet, a laptop computer, a contactless smart card and other portable device.

The mobile device 100 includes a near field communication (NFC) controller 101 that enables the device 100 to interact with another device wirelessly to exchange data with. For example, a user may use the mobile device 100 as an e-purse or a wallet to pay for a purchase or an admission. In operation, the e-purse is controlled by a secure element (SE) 102. Essentially, the SE 102 enables such a mobile device 100 to perform a financial transaction, transport ticketing, loyalty, physical access control, and other exciting new services in a secured manner. To offer such services, the SE 102 is configured to support various applets, applications or modules (only two samples 104 and 106 are shown in FIG. 1A). Depending on implementation, these modules may be hardware modules embedded or inserted thereon, or software modules downloadable from one or more servers via a data network.

When a mobile device is first purchased by or delivered to a customer, the SE 102 in the mobile device is installed with a set of default keys (e.g., an Issuer Security Domain (ISD) key set by the SE manufacturer). Depending on implementation, the SE 102 may be in form of a smart card, an integrated circuit (IC) or a software module upgradable by overwriting some or all of the components therein. In one embodiment, the SE 102 is a tamper proof Smart Card chip capable to embed smart card-grade applications (e.g., payment, transport . . . ) with the required level of security and features. In FIG. 1A, the SE 102 embeds or associates with contactless and NFC-related applications and is connected to the NFC controller 101 to act as the contactless front end.

Typically, a standard-compliant secure element comes with one issuer security domain (ISD) and an option for one or more supplemental security domains (SSD). Each of these domains includes a set of keys. In one embodiment, the SE 102 is a chip embedded in the mobile device 100 or in a miniature card inserted into the mobile device 100 via a card interface 109. In another embodiment, the SE 102 is or includes a software module loaded in a secured memory space 107 in the mobile device 100. The software module may be updated by downloading updating components from a designated server using a network interface 103 (e.g., a 3G network or an LTE network) in the mobile device 100.

The SE 102 needs to go through a personalization process before it can be used. In one embodiment, the personalization process is to load the SE 102 with or update a key set with a derived personalized key set of a chosen card issuer (i.e., a so-called SE issuer). Such a personalization process may be also referred to as a provisioning process. According to one embodiment, the provisioning is performed over the air (OTA) to cause the SE to be personalized while installing an application or enabling a service (i.e., application installation and personalization). The personalization of an SE is only done once to associate the SE to an SE issuer. The application installation and provisioning shall be done for each application when a user subscribes or installs an application.

In one embodiment, when updating or upgrading the SE 102, only one or some components pertaining to the SE 102 are replaced by newer updates to avoid personalizing the SE 102 from beginning. Depending on implementation, such newer updates may be automatically or manually obtained to be loaded into the mobile device 100.

In one embodiment, applications are available for an NFC-enabled mobile device to download from a server or a TSM portal depending on the corresponding SE issuer and the TSM thereof. TSM, standing for Trusted Service Management, is a collection of services. One main role envisaged for the TSM is to help service providers securely distribute and manage contactless services for their customers using the networks of mobile operators. The TSM or its server(s) does not necessarily participate in actual contactless transactions using NFC devices. These transactions are processed normally in whatever system the service provider and its merchant partners have already put in place. Another role of the TSM is to accelerate the successful deployment and ramp-up of mobile NFC applications by acting as a commercial intermediary that facilitates contractual arrangements and other aspects of ongoing business relationships among different parties that make the commerce via the mobile networks possible.

The personalization process can be done either physically in a service center or remotely via a web portal by a TSM server. In the first scenario, the customer may physically go to a service center to let a service representative to personalize the SE in a mobile device. With a computer connected to an NFC reader at a designated place (e.g., a service center), a provisioning manager can be either an installed application or a web-based application connecting to a backend TSM. The provisioning manager is configured to communicate with the SE of the mobile device (e.g., via a reader). Such a personalization process is referred to as a process Over the Internet (OTI).

In the second scenario, the customer registers his/her mobile phone via a server (often a TSM web portal). The TSM server is configured to push a universal resource identifier (URI) of a provisioning manager to the registered mobile phone. Depending on a type of the device, the push can be either an SMS (Short Message Service) Push or a Google Android Push. The customer can download the provisioning manager into the mobile device and start the personalization process. Such a personalization process is referred to as a process Over the Air (OTA).

In either one of the scenarios, the provisioning manager acts as a proxy between the SE in the mobile device and the TSM server. Referring now to FIG. 1B, it shows a flowchart or process 110 of personalizing an SE according to one embodiment of the present invention. Depending on implementation, the process 110 may be implemented in software or a combination of software and hardware. When a user receives a new NFC device (e.g., a part of a mobile device), the SE therein needs to be personalized.

At 112, the new NFC device is determined if it is a genuine NFC device. One example is to check a serial number associated with the NFC device. The serial number may be verified with a database associated with a TSM server. In the example of a NFC mobile device, the device serial number of the mobile device may be used for verification. It is now assumed that the NFC device is a genuine device (recognizable by a mobile operator). The process 110 goes to 114 to have the NFC device communicated with a dedicated server. In one embodiment, the server is a part of the Trusted Service Management (TSM) system and accessible by a wireless network, the Internet or a combination of wireless and wired networks (herein referred to as a data network or simply a network).

At 116, the NFC device is registered with the server. Once the NFC device becomes part of the system, various services or data may be communicated to the device via the network. As part of the personalization process, the server requests device information of the SE at 118. In one embodiment, the server is configured to send a data request (e.g., a WAP PUSH) to the device. In responding to the request, the device sends back CPLC (card product life cycle) information retrieved from the SE. The CPLC includes the SE product information (e.g., the smart card ID, manufacturer information and a batch number and etc.). Based on the CPLC info, the server is able to retrieve corresponding default Issuer Security Domain (ISD) information of this SE from its manufacturer, an authorized distributor or a service provider (referred to as a manufacturer, a distributor or a provider of the SE). Depending on implementation, there are two ways that the server may communicate with a SE manufacturer, which will be fully discussed herein late when deemed appropriate.

At 120, it is up to the manufacturer whether to update the device information. In general, when an SE is shipped from the manufacturer, the SE is embedded with some default device information. If it is decided that the default information such as the CPLC data is to be updated with the manufacturer, the process 110 goes to 122 where the manufacturer uploads corresponding updated device information to the server. The updated device information is transported to the device and stored in the SE at 124. If it is decided that the default information in the SE is not to be updated with the manufacturer, the process 110 goes to 124 to store the retrieved default device information in a database with the TSM server. In one embodiment, the server is configured to include an interface to retrieve a derived SE key set. In one embodiment, the derived key set is generated with the device information (e.g., ISD) of the SE. When the derived ISD key set is successfully installed on the SE, the corresponding SE issuer is notified of the use of the derived ISD key set.

According to one embodiment, the device information (default or updated) is used to facilitate the generation of a set of keys at 126. In one embodiment, the server is configured to establish a secured channel using the default ISD between its hardware security module (HSM) and the SE. The server is also configured to compute a derived key set for the SE. Depending on a business agreement, a master ISD key of an issuer for the SE may be housed in a hardware security module (HSM) associated with the server or in a local HSM of the SE issuer. An HSM is a type of secure crypto-processor targeted at managing digital keys, accelerating crypto-processes in terms of digital signings/second and for providing strong authentication to access critical keys for server applications. If it is housed in the HSM of the server, the server is configured to instruct the HSM to compute the derived key set. Then, the server prepares a mechanism (e.g., PUT KEY APDU) and uses the default channel to replace the default key set in the SE with the derived key set. If the master ISD key of the SE issuer is in a local HSM of the SE issuer, the server is configured to interact with the remote HSM to retrieve the keys.

At 128, the set of keys is securely delivered to the SE. The set of keys is thus personalized to the SE and will be used for various secured subsequent operations or services with the NFC device. The server at 130 is configured to synchronize the SE with the issuer or provider (e.g., sending a notification thereto about the status of the SE).

After the personalization, the SE can only be accessed using the personalized ISD key of the SE issuer. Depending on the security requirement of each service provider, the TSM can create additional SSDs for the various providers to personalize their respective applications (e.g., the modules 104 or 106 of FIG. 1A).

As mentioned above, there are two ways that may be used to retrieve the corresponding default Issuer Security Domain (ISD) information from the SE in interfacing with the manufacturer thereof. Depending on the infrastructure, a manufacturer can choose to use a real-time approach or a batch approach.

In the real-time approach, the server is configured to communicate with the manufacturer (i.e., its server thereof) when an SE by the manufacturer is being personalized by the TSM server. The default key set is, thus, retrieved on demand from the server of the manufacturer. In one embodiment, the TSM server includes a plugin module for each of the manufacturers to communicate therewith.

Figure 1C:
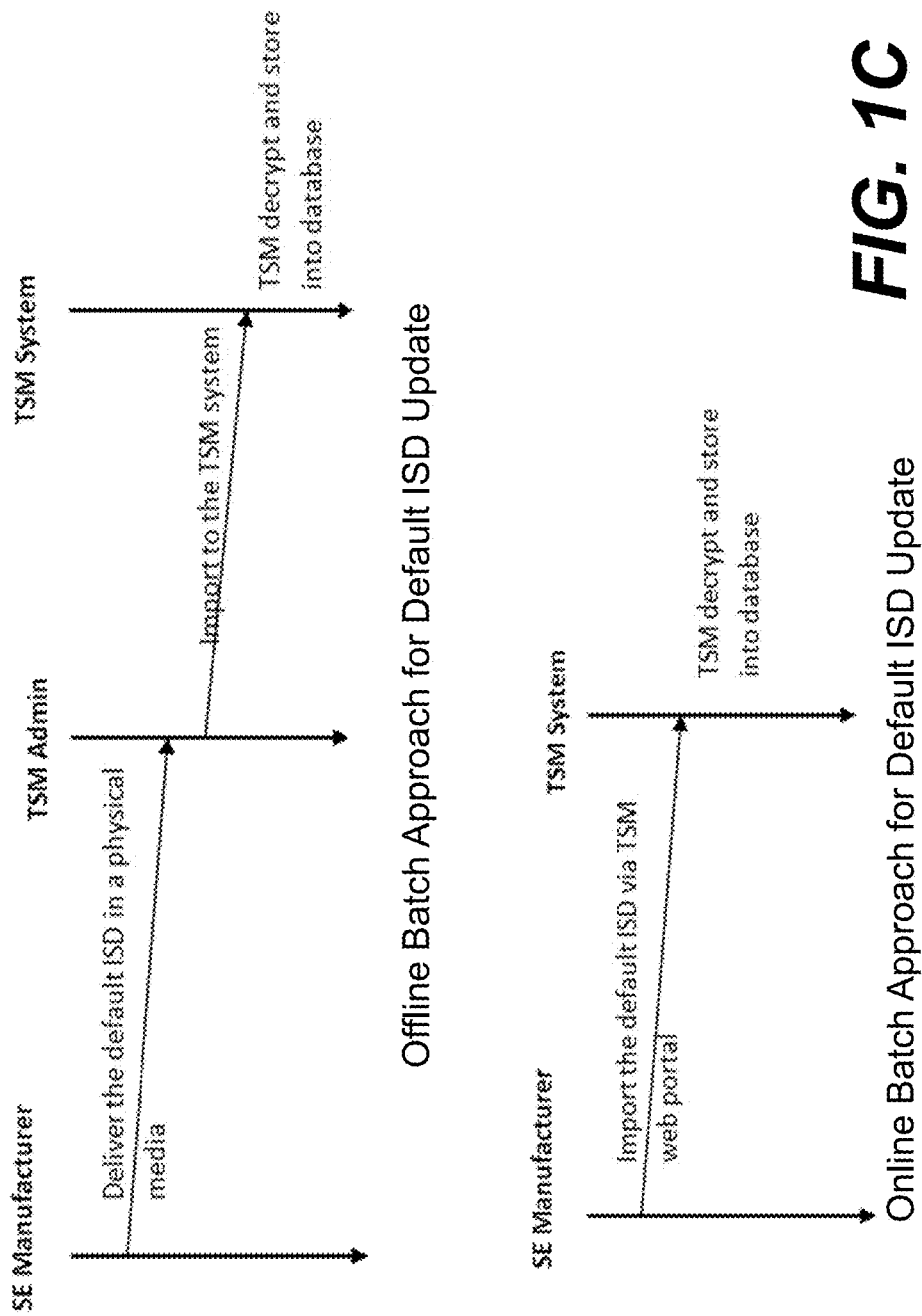
FIG. 1C shows relationships among an SE manufacturer, a TSM admin and the TSM system for both offline and online modes.

In the batch approach, it can be done either offline mode or online mode. In the offline mode, the SE manufacturer delivers the default ISD information for all SEs being supported via an encrypted physical media. An administrator for the TSM may or a computing device may be configured to import the information in the media to a computing device. The default ISDs are then decrypted and retrieved, and stored in a database. In the online mode, the SE manufacturer uploads the default ISD information for the SEs it supports via a network. The default ISDs are then decrypted and retrieved, and stored in a database. Afterwards, the TSM only needs to access its own HSM o the database during an SE personalization process. FIG. 1C shows relationships among the SE manufacturer, the TSM admin and the TSM system for both offline and online modes.

According to one embodiment of the present invention, FIG. 1D illustrates data flows among a user for an NFC device (e.g., an NFC mobile phone), the NFC device itself, a TSM server, a corresponding SE manufacturer and an SE issuer.

In one perspective, the SE 102 of FIG. 1A may be perceived as a preload operating system in a smart card, providing a platform for PIN management and security channels (security domains) for card personalization. The SE 102 combines the interests of smart card issuers, vendors, industry groups, public entities and technology companies to define requirements and technology standards for multiple applications running in the smart cards.

As an example, one module 104 referred to as an e-purse security defines a set of protocols that enable micro payment transactions to be carried out in both wired and wireless environments. With an electronic purse (a.k.a., e-purse) stored on a smart card, a set of keys (either symmetric or asymmetric) is personalized into the e-purse after the e-purse is issued. During a transaction, the e-purse uses a set of respective keys for encryption and MAC computation in order to secure the message channel between the e-purse and an SAM (Security Authentication Module) or backend servers. For a single functional card, the e-purse security 104 is configured to act as gates to protect actual operations performed on a single functional card. During personalization, the single functional card access keys (or its transformation) are personalized into the e-purse with the e-purse transaction keys.

Figure 1E:
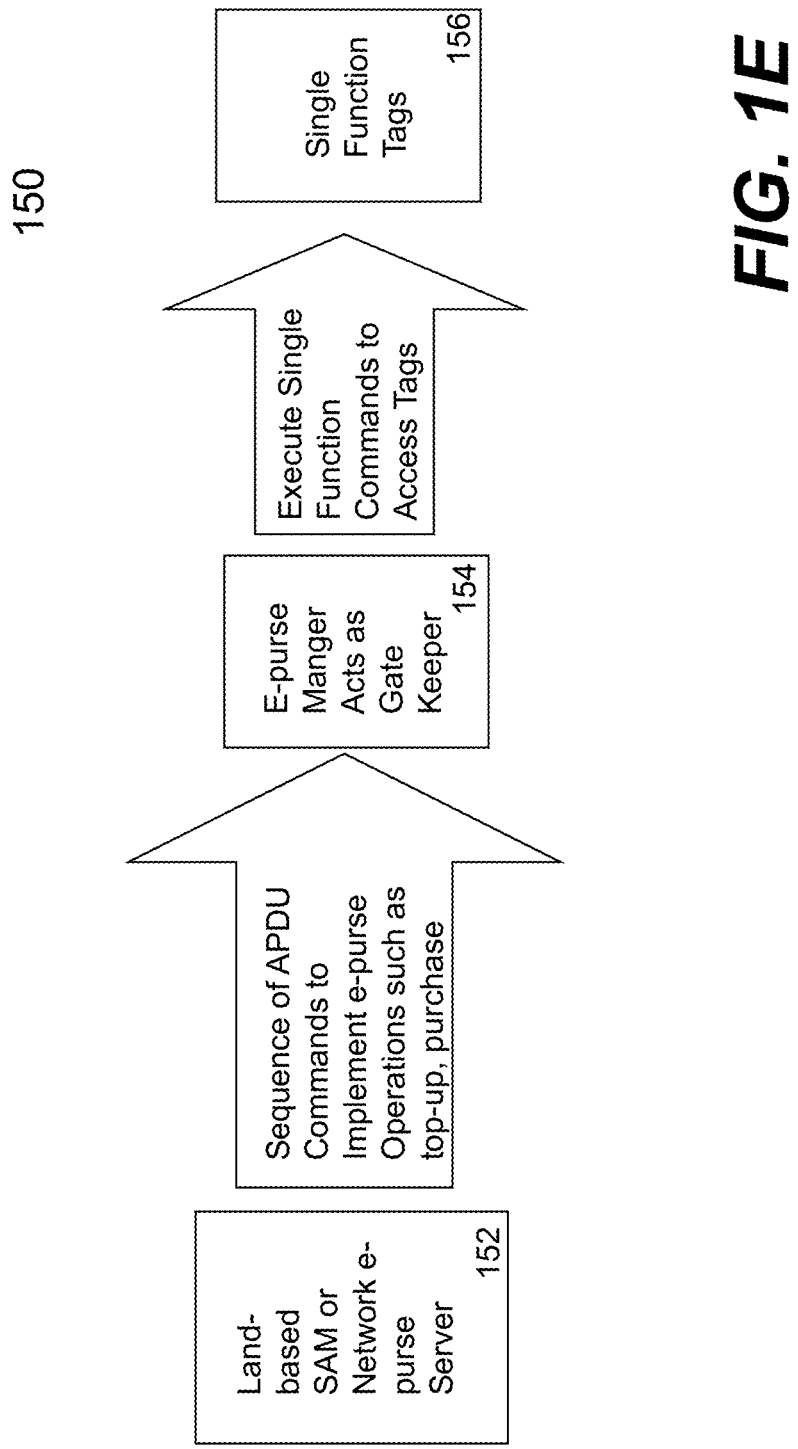
FIG. 1E shows a data flowchart or process of personalizing data flow among three entities: a land-based SAM or a network e-purse server, an e-purse acting as a gatekeeper, and a single function tag, according to one embodiment.

FIG. 1E shows a flowchart or process 150 of personalizing data flow among three entities: a land-based SAM or a network e-purse server 152, an e-purse 154 acting as a gatekeeper, and a single function tag 156. Communications between the land-based SAM or the network e-purse server 152 and the e-purse 154 are conducted in sequence of a type of commands (e.g., APDU) while communications between the e-purse 154 and the single function tag 156 are conducted in sequence of another type of commands, wherein the e-purse 154 acts as the gate keeper to ensure only secured and authorized data transactions could happen.

In one embodiment, the physical security for the e-purse is realized in an emulator. As used herein, an emulator means a hardware device or a program that pretends to be another particular device or program that other components expect to interact with. The e-purse security is realized between one or more applets configured to provide e-purse functioning and communication with a payment server. An SE supporting the e-purse is responsible for updating security keys to establish appropriate channels for interactions between a payment server and the applets, wherein the e-purse applet(s) acts as a gatekeeper to regulate or control the data exchange.

Referring now to FIG. 2A, it shows a mobile payment ecosystem 200 in which related parties are involved in order for the mobile payment ecosystem successful. According to one embodiment, an NFC device is allowed to install or download one or more applications from respective designated servers 202 (i.e., application management providers), where the applications are originally developed by developers 204 and distributed by service providers 210, application management providers 202 or others. It is assumed that the secure element 206 provided by a secure element provider 208 has already been personalized via a TSM or a trusted third party (e.g., a financial institution 212).

Once an application is installed in the NFC device, the next step is to provision the application with the secure element. An application provisioning process can be started in several ways. One of the ways is that an SE holder selects an application from a TSM portal on the mobile device and initiates the provisioning process. Another one is that the SE holder receives an application provisioning notification on the mobile device from the TSM on behalf of an application (service) provider.

The TSM or application providers can publish their applications on a TSM portal to be downloaded to a mobile device with the SE and/or subscribed at a request of a user (a.k.a., an SE holder). In one embodiment, the TSM is a cloud service to serve many SE issuers. Thus, many applications from various service providers are available on the TSM portal. However, when getting onto the TSM portal, SE holders can only see those applications approved by its SE issuer. Depending on the arrangement between an SE and a service provider, an application can either be downloaded/installed/personalized using the ISD keyset of the SE or a specific SSD keyset of the service provider. If a SSD keyset has not been installed on the SE, it can be installed during an application installation.

The TSM knows the memory state of an SE for various SSDs. Based on the state of the SE and the memory allocation policy of the SSDs, the available applications for the various SSD in the application store may be marked with different indicators, for example, "OK to install", or "Insufficient memory to install". This will prevent unnecessary failure for users.

Once an application is installed on an NFC device, the application initiates a provisioning process by itself, or the TSM can push a provisioning notification to the NFC device via a cellular network or a wireless data network. Depending on the type of the devices, there are many different types of push messages to cause the NFC device to initial the provision process. An example of the push methods includes an SMS push or an Android Google Push. Once user accepts the notification, the provisioning process starts. The details of the provisioning process will be described below whenever deemed appropriate.

As part of the application provisioning, a TSM server implements some protective mechanism. One is to prevent an SE from being accidentally locked. Another is to disable application download if there is no sufficient memory on SE.

An SE may permanently lock itself if there are too many failed mutual authentications during secure channel establishment. In order to prevent the SE from being accidentally locked, the TSM keeps the track of the number of failed authentications between an SE and the TSM when establishing a secured channel between the two entities. In one embodiment, the TSM is configured to reject any further request if a preset limit is reached. The TSM can continue to process the SE request if the SE is reset at the service center manually.

The TSM also keeps track of the memory usage of each SE. The TSM decides whether an application can be installed on an SE based on the memory allocation assigned by the SE issuer to each service provider. According one embodiment, there are three types of policies:

Pre-assigned a fixed memory. This is the guaranteed space.
Pre-assigned a minimum memory. This is the guaranteed minimum space.
Best efforts.

The SE issuer uses the TSM web portal to make this assignment.

1. For a batch of SE, the SE issuer can pre-assign a memory policy for a service provider to install its applications via the TSM web portal;
2. The TSM server verifies whether the space of the respective service provider conforms to its policy when a Mobile Device requests to install one of its applications. If not conformed, this request is rejected;
3. Otherwise, the TSM server will proceed to handle the provisioning request;
4. If the provisioning succeeds, the TSM will accumulate the memory size of this application service.

When a mobile user subscribes to a mobile application (assuming it has been installed), the application has to be provisioned with the SE in the mobile device before it can be used. According to one embodiment, the provisioning process includes four major stages:

Create an supplemental security domain (SSD) on the SE, if needed;
Download and install an application cap on the SE;
Personalize the application on the SE; and
Download a UI component on mobile phone.

Figure 2B:
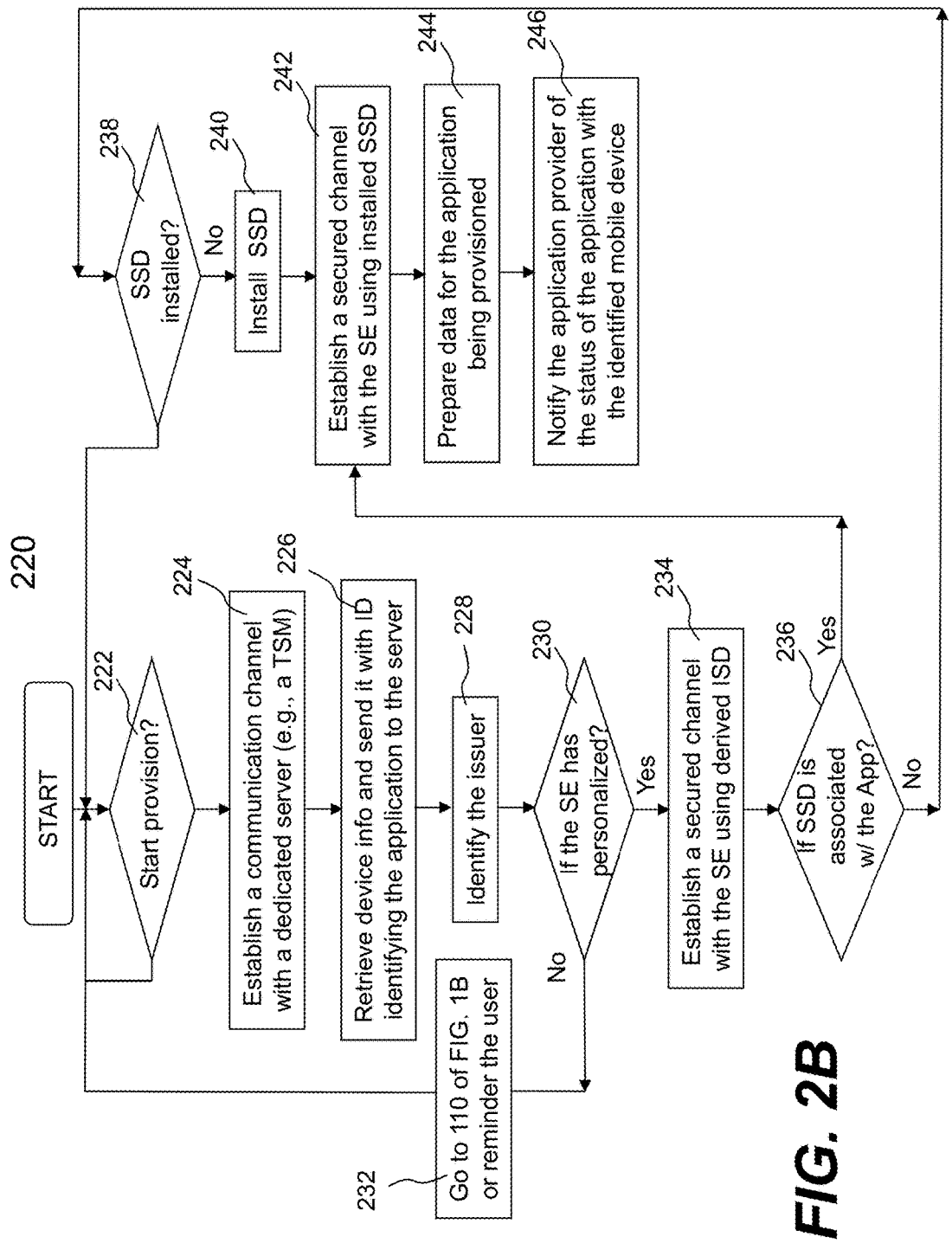
FIG. 2B shows a flowchart or process of provisioning one or more applications according to one embodiment.

FIG. 2B shows a flowchart or process 220 of provisioning one or more applications according to one embodiment. The process 220 may be implemented in software or a combination of software and hardware. In one embodiment, the application provisioning process 220 needs to go through a provisioning manager (i.e., proxy) on the mobile phone to interact with the SE therein.

As shown in FIG. 2B, at 222, the application provisioning process 220 may be started manually or automatically. For example, a user may initiate the process 220 by selecting an installed application to subscribe related services or the installed application, when activated, initiates the provisioning process, provided it has not been provisioned. In another embodiment, a provider of an application pushes a message (e.g., SMS) to the mobile phone to initiate the provisioning process.

In any case, the process 220 goes to 224 to establish a communication with a dedicated server (e.g., a TSM server or a server operated by an application distributor) after the device information (e.g., CPLC) is retrieved from the SE in the mobile device. The device information along with an identifier identifying the application is transmitted to the server at 226. Based on the device information, the server identifies the issuer for the SE first at 228 to determine if the SE has been personalized at 230. If the SE has not been personalized, the process 220 goes to 232 to personalize the SE, where one embodiment of the function 232 may be implemented in accordance with the process 110 of FIG. 1B.

It is now assumed that the SE in the mobile device has been personalized. The process 220 now goes to 234 to establish a secure channel with the SE using the derived ISD. Depending on who houses the HSM (TSM or SE issuer) for the ISD, the server will contact the HSM to compute the derived ISD for the SE and establish a secure channel with the SE using this derived ISD. The server is then configured to check to see whether there is an SSD associated with this application at 236. If there is not an SSD associated with the application, the server is configured to check a database to see whether it has been installed with this SE. If the SSD installation is needed, then the process 220 goes to install the SSD. In one embodiment, the user is alerted of the installation of the SSD (keys). Should the user refuse to install the SSD at 238, the process 220 stops and goes to 222 to restart the provisioning process 220.

It is now assumed that the process of installing the SSD proceeds at 240. Installing the SSD is similar to installing the ISD. The TSM server is configured to contact the HSM that houses the SSD master key to compute the derived SSD key set for the SE. The master SSD key set can be either in the TSM or with the service provider or the SE issuer, largely depending on how the arrangement is made with all parties involved.

To download/install the application cap to the SE, the server is configured to establish a secure channel with the SE using this derived SSD at 242. In one embodiment, this is similar to how the ISD-based secure channel is established. At 244, the data for the application is prepared, the detail of which will be further discussed below. According to one embodiment, the server is configured to contact the service provider to prepare STORE DATA APDUs. Depending on an application installed in a mobile device, the server may be caused to repeatedly issue STORE DATA to personalize the application with the SE. Additional data including an appropriate interface (e.g., a user interface of the application per the mobile device) may be downloaded provided that the provisioning process is successfully done. At 246, the server will notify the application provider the status of the application that has been provisioned.

Figure 2C:
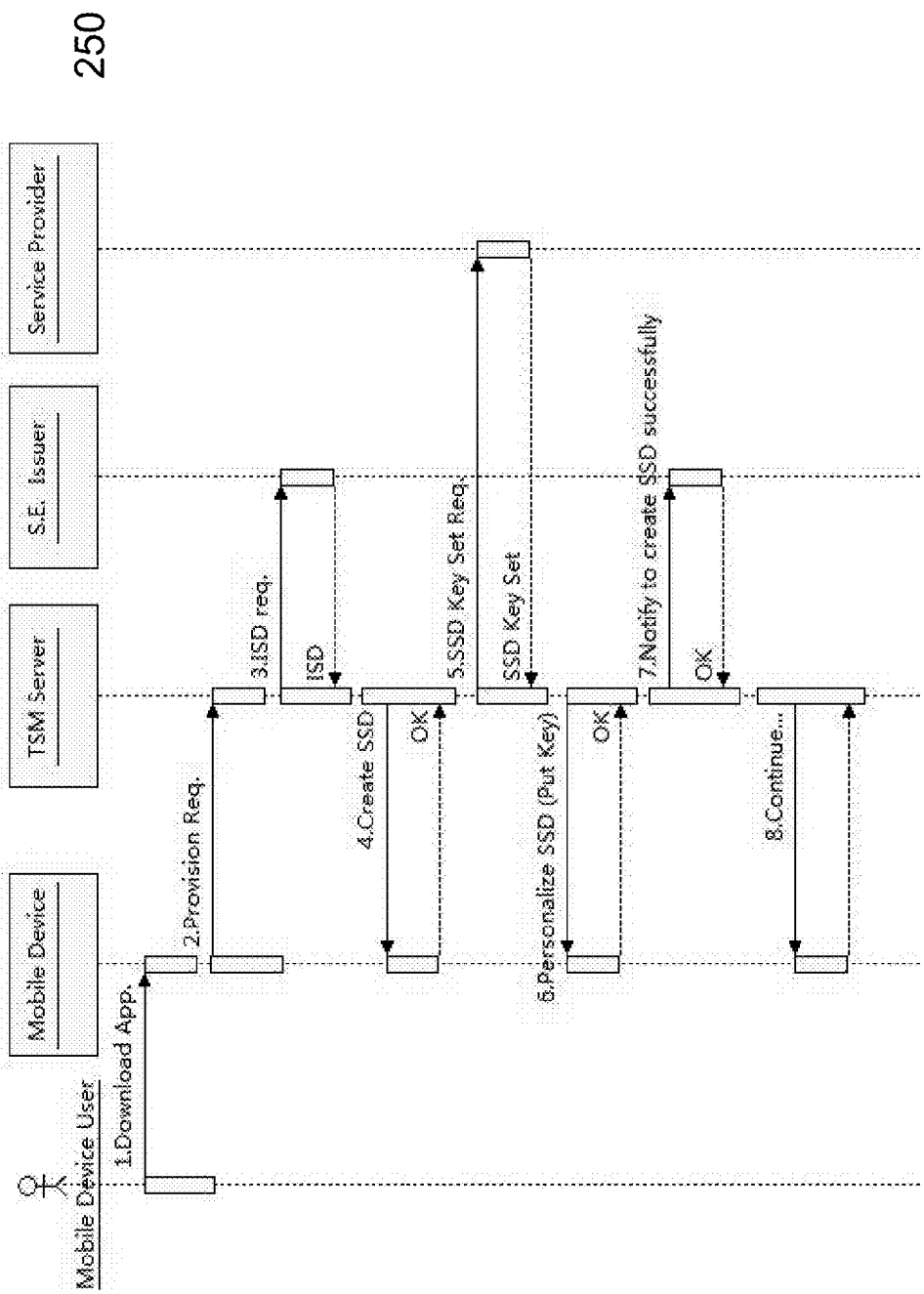
FIG. 2C shows a data flow illustrating various interactions among different parties when an application is being provisioned in one embodiment.

FIG. 2C shows a data flow 250 illustrating various interactions among different parties when an application is being provisioned in one embodiment.

As shown in 244 of FIG. 2B, one of the important functions in provisioning an application is to prepare customized application data for the targeted SE. For example, for an e-purse application, the personalized data for the application includes various personalized transaction keys generated based on the device information (e.g., CPLC info) of the SE. For transit e-purse, part of the personalized data includes the Mifare access keys derived from an identifier (ID) of the Mifare card, the server is configured to personalize both Java Card applications and Mifare4Mobile service objects. In general, there are at least two different ways to prepare the data to facilitate subsequent transactions.

For data preparation, one embodiment of the present invention supports two operation modes to interact with service providers for computing the personalized application data. For the first mode, a TSM server does not have direct access to the HSM associated with a service provider. The service provider may have a server interacting with its HSM to generate the application keys (e.g., Transit, e-purse, or Mifare Key). The TSM data preparation implementation is to make use of application program interfaces (API) or a protocol provided by the server to request for derived application keys. The second mode is that data preparation implementation can directly access the HSM associated with the service provider to generate the application keys.

Figure 2D:
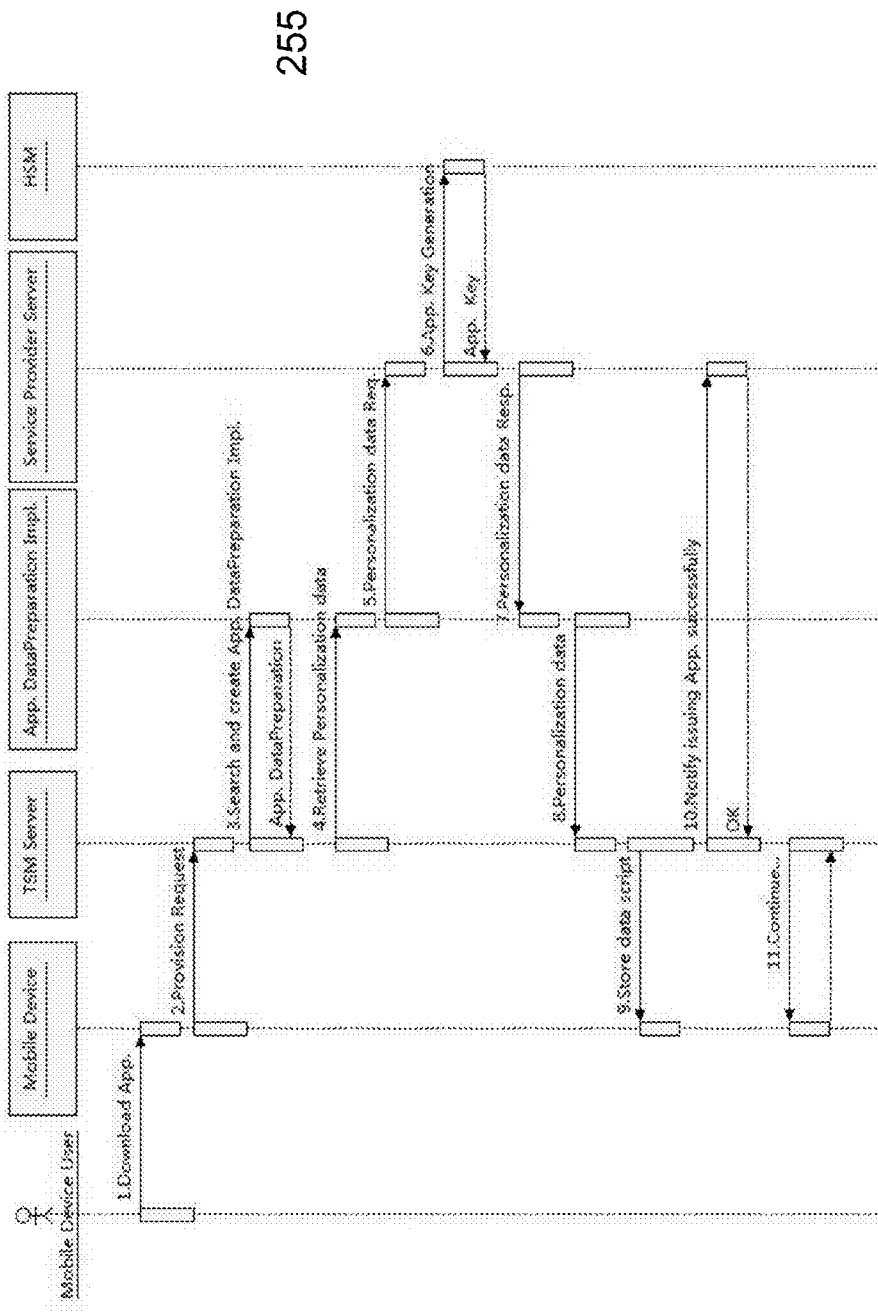
FIG. 2D shows a data flow among different entities when preparing the application data in provisioning an application.

According to one embodiment, FIG. 2D shows a data flow 255 among different entities when preparing the application data in provisioning an application. FIG. 2D is provided for the first mode in which a TSM server does not have direct access to the HSM associated with a service provide. The second mode has the similar flow except that the application data preparation implementation will interact directly with the HSM of a service provider.

Figure 2E:
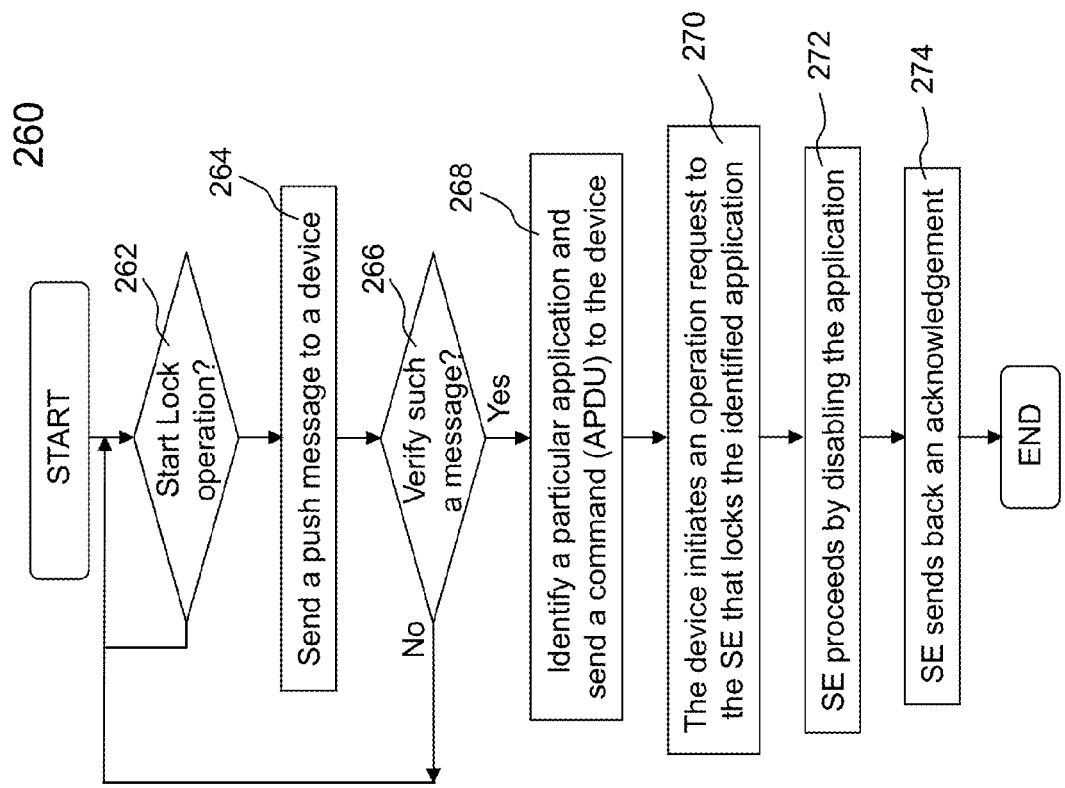
FIG. 2E shows a flowchart or process for locking or disabling an installed application.

Besides supporting a provisioning process, one embodiment of the present invention also supports the life cycle management of an SE. The life cycle management includes, but may not be limited to, SE lock, SE unlock, Application Delete (disabling). The initiation of these activities may be through a TSM push notification. In actual use of mobile devices, FIG. 2E shows a flowchart or process 260 of locking an installed application. An NFC device may have been installed with a number of applications in connection with or running on top of the secured element therein. For some reason (e.g., no activity for a prolonged period or expiration), an application needs to be disabled or locked by its distributor or provider.

The operation or process 260 to disable an installed application is initiated at 262. In one embodiment, the process 260 is initiated by an operator manually via a TSM web portal. In another embodiment, the process 260 is automatically initiated by a service provider internal workflow (e.g., using TSM web service API). Once the process 260 is initiated, a message is pushed to a NFC device (e.g., within a mobile device) in which an application is to be disabled. Depending on application, such a message may come in different forms. In one embodiment, the message is a PUSH command. In another embodiment, the message is a TCP/IP request delivered to the device via a network. The message may be sent from a server (e.g., a TSM server) at 264. Depending on implementation, such a message may include an identifier identifying an application to be locked or disabled. Upon receiving such a message, a card manager proxy on the device is caused to verify whether such a message is indeed from its original distributor or provider by returning a message at 266. According to one embodiment, the message is sent to a TSM server for verification. If the verification fails, namely there is no acknowledgement to such an inquiry, the process 260 is abandoned.

It is now assumed that the verification is successful, namely the inquiry from the device to a provider of the application returns an acknowledgement that the original request is authenticated. In general, such an acknowledgement includes an identifier confirming the application to be locked at 268. The TSM server is configured to establish a secure channel with the SE as described previously. Then, the TSM server is to prepare appropriate APDUs (such as SET STATUS, or/and DELETE) for the SE for execution via the card manager proxy.

In any case, in responding to the command, the SE proceeds by locking the application at 272. According to one embodiment, the SE is caused to disassociate with the application, thus making the installed application no longer usable with the SE. At 274, the SE is configured to send out an acknowledgement to notify related parties that this application is no longer operating in the device. In one embodiment, the acknowledgement is sent over to the TSM server where there is a database recording what applications have been installed in what device, and a corresponding status of each. The database is updated with the acknowledgement from the SE.

FIG. 2E shows a flowchart or process for locking or disabling an installed application. It is known to those skilled in the art that other operations, such as unlocking or enabling an installed application, extending expiration of an installed application, are similar to those shown in FIG. 2E.

Figure 2F:
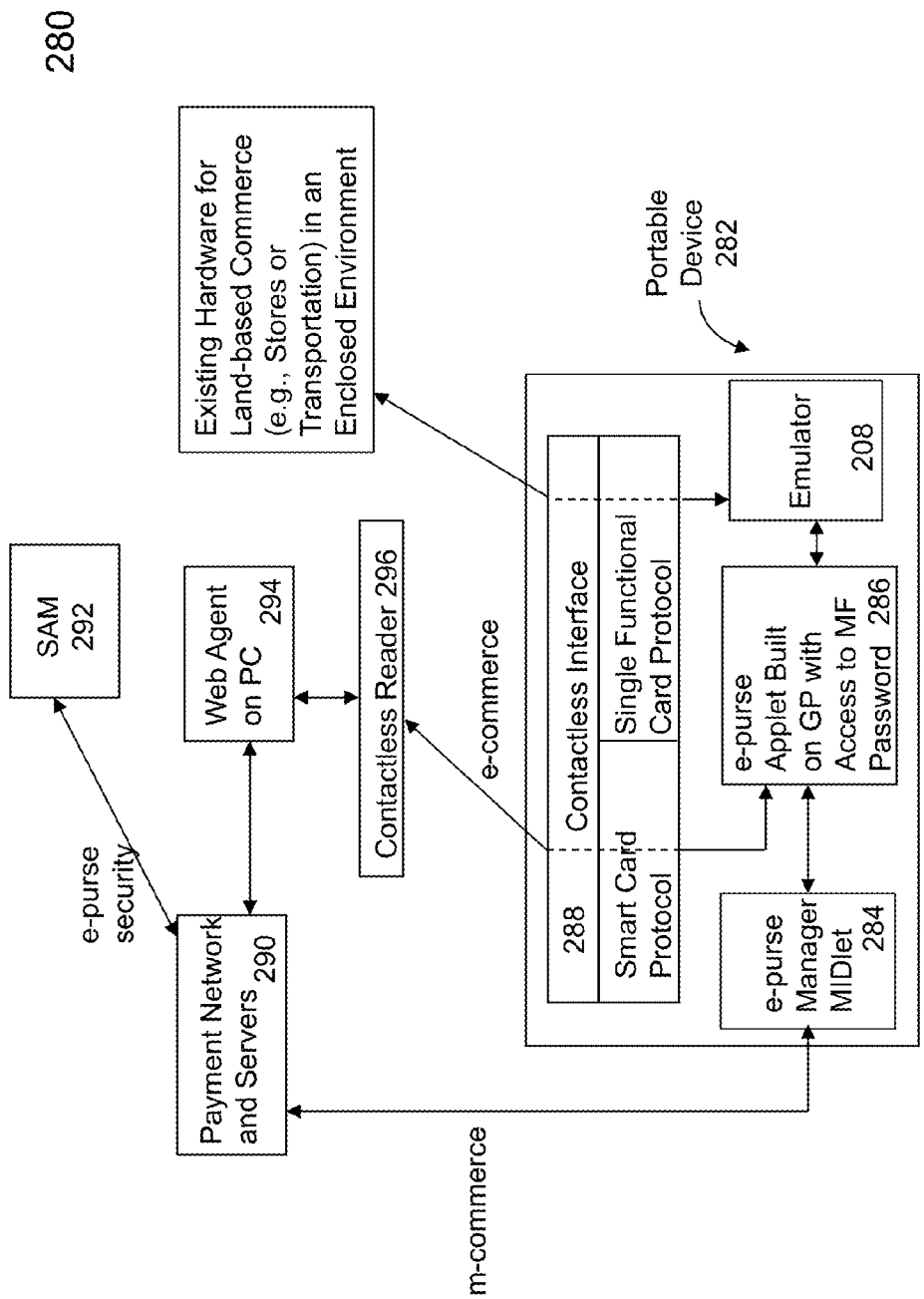
FIG. 2F shows an exemplary architecture diagram of a portable device enabled as an e-purse conducting e-commerce and m-commerce, according to one embodiment of the present invention.

Referring now to FIG. 2F, there shows an exemplary architecture diagram 280 of a portable device enabled as an electronic wallet or e-purse to facilitate e-commerce and m-commerce, according to one embodiment of the present invention. The diagram 280 includes a cell phone 282 embedded with a smart card module. An example of such a cell phone is a near field communication (NFC) enabled cellphone that includes a Smart MX (SMX) module. It shall be noted that a secure element and an application may be integrated. Unless explicitly stated, the following description will not call out which part is performing the function of a secure element and which part is performing as a application. Those skilled in the art shall appreciate the proper parts or functions being performed given the detailed description herein.

The SMX is pre-loaded with a Mifare emulator 288 (which is a single functional card) for storing values. The cell phone is equipped with a contactless interface (e.g., ISO 14443 RFID) that allows the cell phone to act as a tag. In addition, the SMX is a JavaCard that can run Java applets. According to one embodiment, an e-purse is built as an applet in SMX. The e-purse is configured to be able to access the Mifare data structures with appropriate transformed passwords based on the access keys.

In the cell phone 282, an e-purse manager MIDlet 204 is provided. For m-commerce, the MIDlet 284 acts as an agent to facilitate communications between an e-purse applet 286 and one or more payment network and servers 290 to conduct transactions therebetween. As used herein, a MIDlet is a software component suitable for being executed on a portable device. The e-purse manager MIDlet 284 is implemented as a "MIDlet" on a Java cell phone, or an "executable application" on a PDA device. One of the functions of the e-purse manager MIDlet 284 is to connect to a wireless network and communicate with an e-purse applet which can reside on either the same device or an external smart card. In addition, it is configured to provide administrative functions such as changing a PIN, viewing an e-purse balance and a transaction history log. In one application in which a card issuer provides a SAM 292 that is used to enable and authenticate any transactions between a card and a corresponding server (also referred to as a payment server). As shown in FIG. 2F, APDU commands are constructed by the servers 290 having access to a SAM 292, where the APDU is a communication unit between a reader and a card. The structure of an APDU is defined by the ISO 7816 standards. Typically, an APDU command is embedded in network messages and delivered to the server 290 or the e-purse applet 286 for processing.

For e-commerce, a web agent 294 on a computer (not shown) is responsible for interacting with a contactless reader (e.g., an ISO 14443 RFID reader) and the network server 290. In operation, the agent 294 sends the APDU commands or receives responses thereto through the contactless reader 296 to/from the e-purse applet 286 residing in the cell phone 282. On the other hand, the agent 294 composes network requests (such as HTTP) and receives responses thereto from the payment server 280.

Figure 3A:
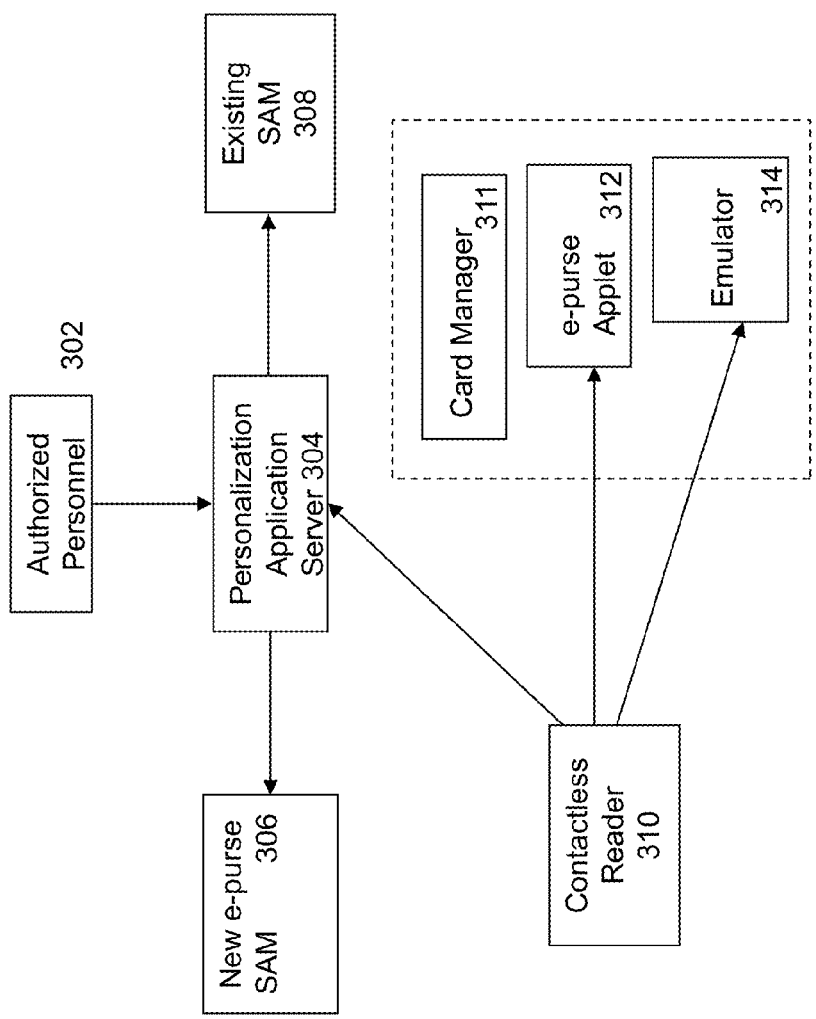
FIG. 3A is a block diagram of related modules interacting with each other to achieve what is referred to herein as e-purse personalization by an authorized personnel (a.k.a., personalizing a mobile device or a secure element therein while provisioning an application)
Figure 3B:
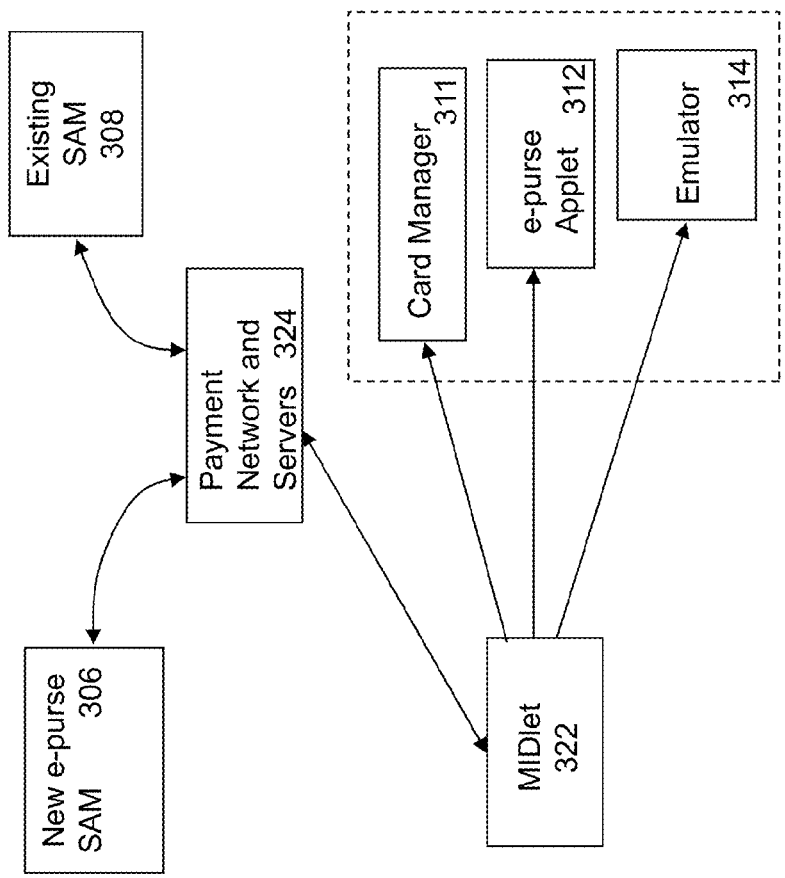
FIG. 3B shows a block diagram of related modules interacting with each other to achieve what is referred to herein as e-purse personalization by a user of the e-purse.

To personalize the cell phone 282, FIG. 3A shows a block diagram 300 of related modules interacting with each other to achieve what is referred to herein as e-purse personalization (or provisioning) by an authorized person. FIG. 3B shows a block diagram 320 of related modules interacting with each other to achieve what is referred to herein as e-purse personalization by a user of the e-purse as shown in FIG. 2F.

Figure 3C:
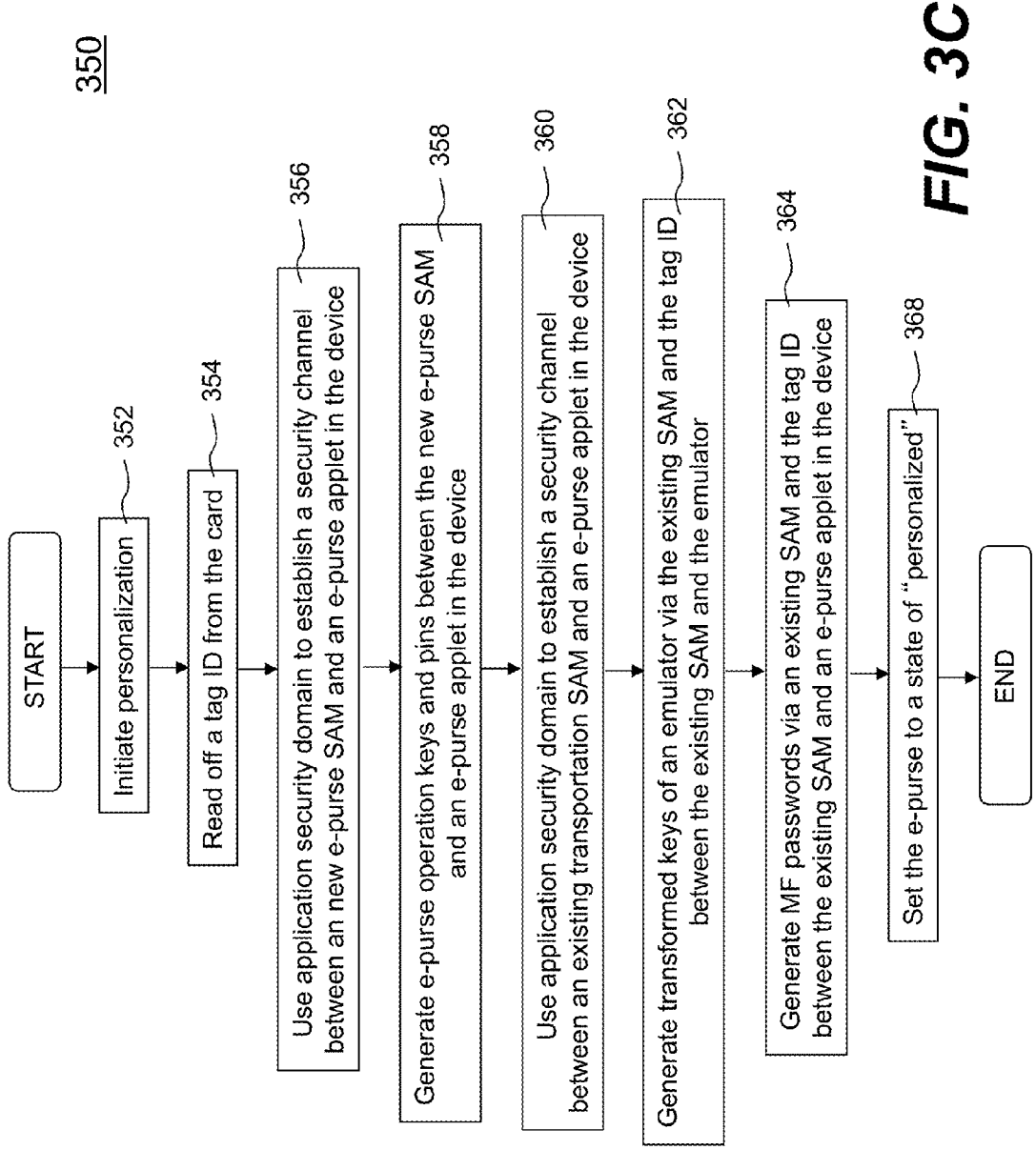
FIG. 3C shows a flowchart or process of personalizing an e-purse according to one embodiment of the present invention.

FIG. 3C shows a flowchart or process 350 of personalizing an e-purse applet according to one embodiment of the present invention. FIG. 3C is suggested to be understood in conjunction with FIG. 3A and FIG. 3B. The process 350 may be implemented in software, hardware or a combination of both.

As described above, an e-purse manager is built on top of a global platform to provide a security mechanism necessary to personalize e-purse applets designed therefor. In operation, a security domain is used for establishing a secured channel between a personalization application server and the e-purse applet. According to one embodiment, the essential data to be personalized into the e-purse applet include one or more operation keys (e.g., a load or top-up key and a purchase key), default PINs, administration keys (e.g., an unblock PIN key and a reload PIN key), and passwords (e.g., from Mifare).

It is assumed that a user desires to personalize an e-purse applet embedded in a portable device (e.g., a cell phone). At 352 of FIG. 3C, a personalization process is initiated. Depending on implementation, the personalization process may be implemented in a module in the portable device and activated manually or automatically, or a physical process initiated by an authorized person (typically associated with a card issuer). As shown in FIG. 3A, an authorized personal initiates a personalization process 304 to personalize the e-purse applet for a user thereof via an existing new e-purse SAM 306 and an existing SAM 308 with the contactless reader 310 as the interface. The card manager 311 performs at least two functions: 1) establishing a security channel, via a security domain, to install and personalize an external application (e.g., e-purse applet) in the card personalization; and 2) creating security means (e.g., PINs) to protect the application during subsequent operations. As a result of the personalization process using the personalization application server 304, the e-purse applet 312 and the emulator 314 are personalized.

Similarly, as shown in FIG. 3B, a user of an e-purse desires to initiate a personalization process to personalize the e-purse applet wirelessly (e.g., via the m-commerce path of FIG. 2). Different from FIG. 3A, FIG. 3B allows the personalization process to be activated manually or automatically. For example, there is a mechanism on a cell phone that, if pressed, activates the personalization process. Alternatively, a status of "non-personalized" may prompt to the user to start the personalization process. As described above, a MIDlet 322 (i.e., a provisioning manager or a service manager) in a portable device acts as an agent to facilitate the communication between a payment server 324 and the e-purse applet 312 as well as the emulator 314, wherein the payment server 324 has the access to the existing new e-purse SAM 306 and an existing SAM 308. As a result of the personalization process, the e-purse applet 312 and the emulator 314 are personalized.

Referring now back to FIG. 3C, after the personalization process is started, in view of FIG. 3A, the contactless reader 310 is activated to read the tag ID (i.e., RFID tag ID) and essential data from a smart card in the device at 354. With an application security domain (e.g., a default security setting by a card issuer), a security channel is then established at 356 between a new e-purse SAM (e.g., the SAM 306 of FIG. 3A) and an e-purse applet (e.g., the e-purse applet 312 of FIG. 3A) in the portable device.

Each application security domain key set includes at least three (3) DES keys. For example:

Key1: 255/1/DES-ECB/404142434445464748494a4b4c4d4e4f
Key2: 255/2/DES-ECB/404142434445464748494a4b4c4d4e4f
Key3: 255/3/DES-ECB/404142434445464748494a4b4c4d4e4f

A security domain is used to generate session keys for a secured session between two entities, such as the card manager applet and a host application, in which case the host application may be either a desktop personalization application or a networked personalization service provided by a backend server.

A default application domain can be installed by a card issuer and assigned to various application/service providers. The respective application owner can change the value of the key sets before the personalization process (or at the initial of the process). Then the application can use the new set to create a security channel for performing the personalization process.

With the security channel is established using the application provider's application security domain, the first set of data can be personalized to the e-purse applet. The second set of data can also be personalized with the same channel, too. However, if the data are in separate SAM, then a new security channel with the same key set (or different key sets) can be used to personalize the second set of data.

Via the new e-purse SAM 306, a set of e-purse operation keys and PINs are generated for data transactions between the new e-purse SAM and the e-purse applet to essentially personalize the e-purse applet at 358.

A second security channel is then established at 360 between an existing SAM (e.g., the SAM 308 of FIG. 3A) and the e-purse applet (e.g., the e-purse applet 312 of FIG. 3A) in the portable device. At 362, a set of transformed keys is generated using the existing SAM and the tag ID. The generated keys are stored in the emulator for subsequent data access authentication. At 358, a set of MF passwords is generated using the existing SAM and the tag ID, then is stored into the e-purse applet for future data access authentication. After it is done, the e-purse including the e-purse applet and the corresponding emulator is set to a state of "personalized".

Figure 4A:
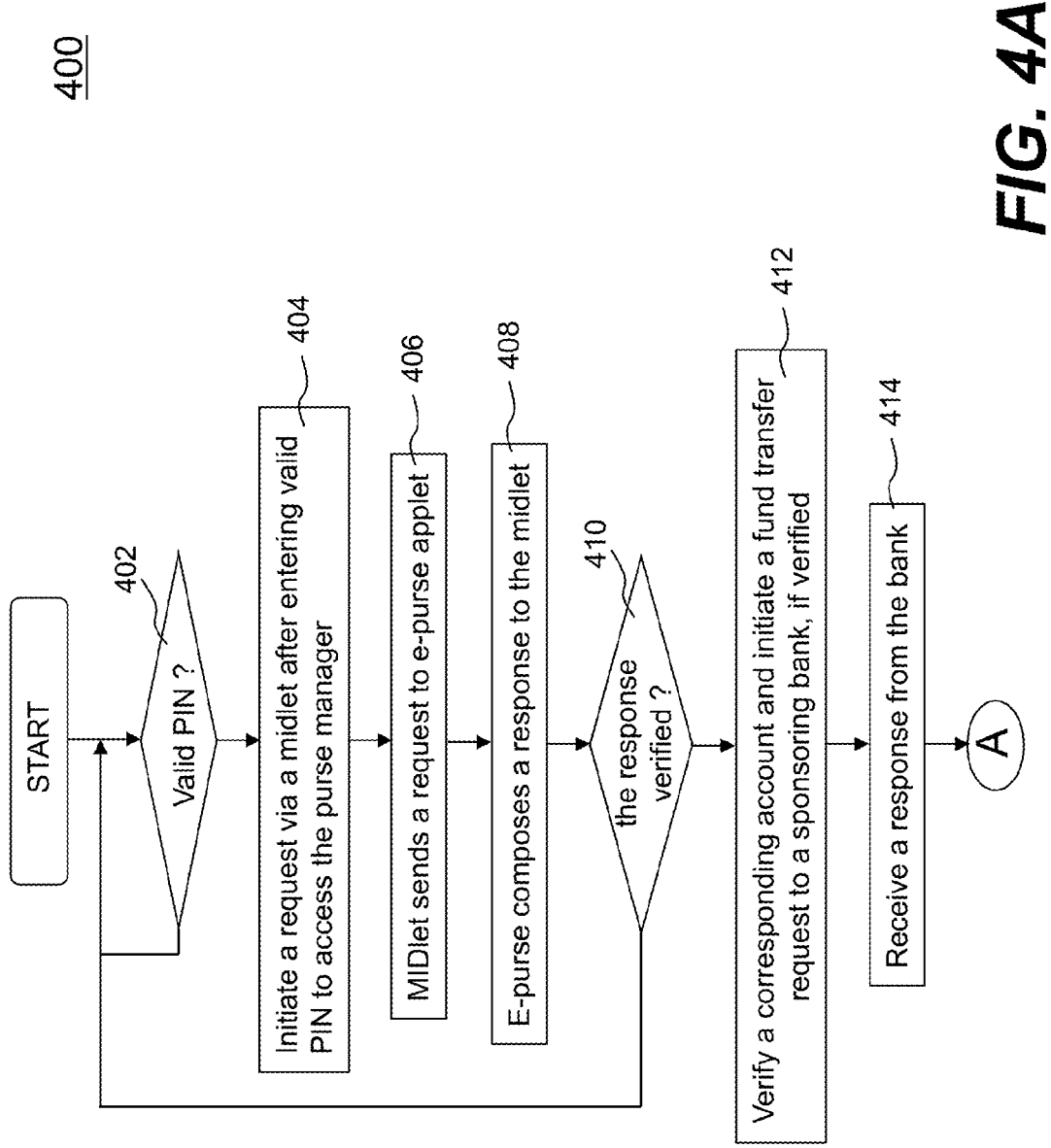
FIG. 4A and FIG. 4B show together a flowchart or process of financing, funding, load or top-up an e-purse according to one embodiment of the present invention.
Figure 4B:
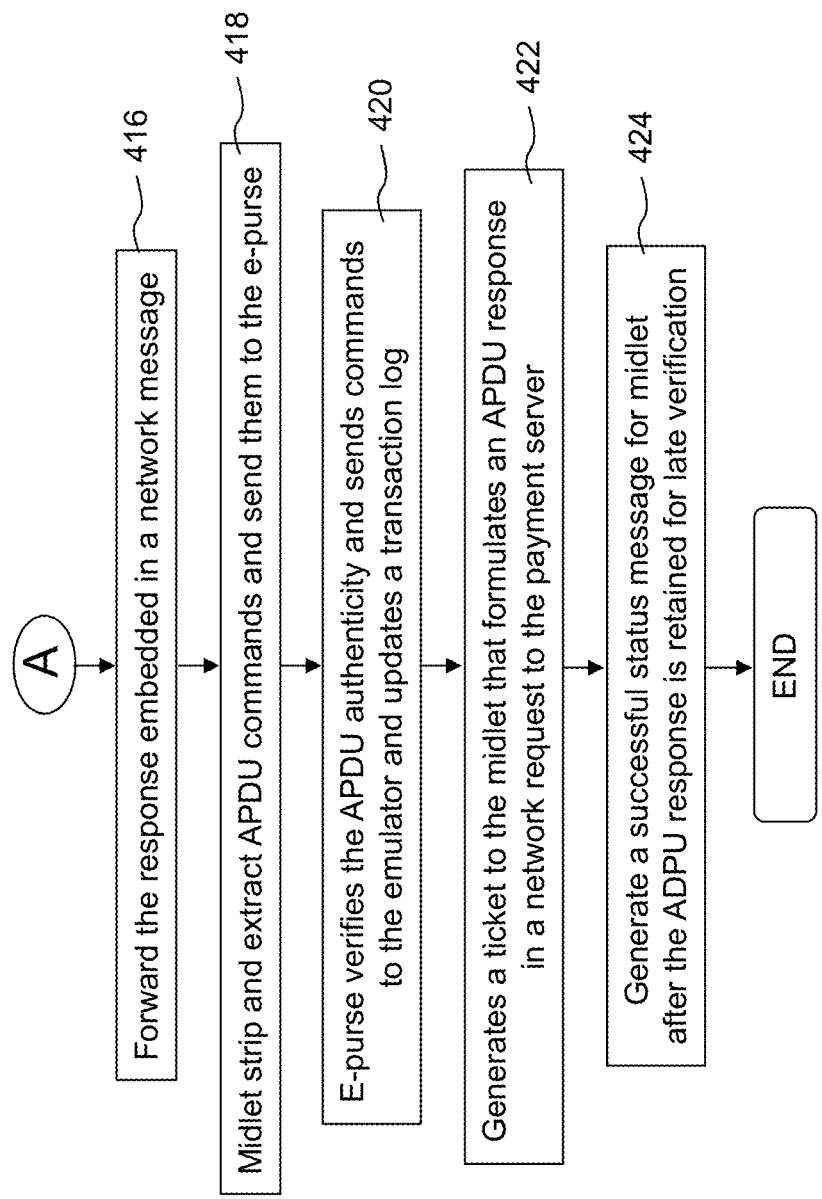
Figure 4C:
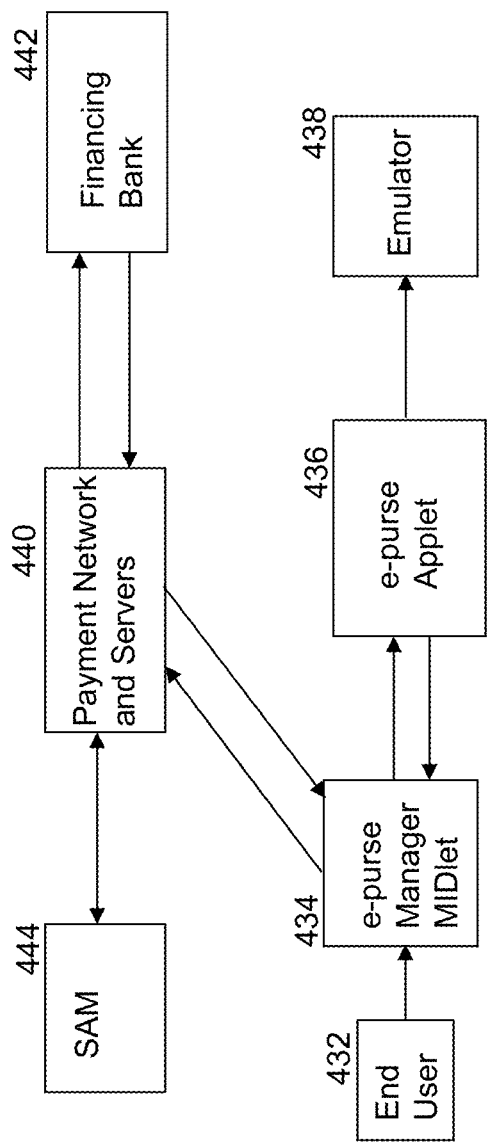
FIG. 4C shows an exemplary block diagram of related blocks interacting with each other to achieve the process FIG. 4A and FIG. 4B.

FIG. 4A and FIG. 4B show together a flowchart or process 400 of financing or funding an e-purse according to one embodiment of the present invention. The process 400 is conducted via the m-commerce path of FIG. 2. To better understand the process 400, FIG. 4C shows an exemplary block diagram 450 of related blocks interacting with each other to achieve the process 400. Depending on an actual application of the present invention, the process 400 may be implemented in software, hardware or a combination of both.

A user is assumed to have obtained a portable device (e.g., a cell phone) that is configured to include an e-purse. The user desires to fund the e-purse from an account associated with a bank. At 402, the user enters a set of personal identification numbers (PIN). Assuming the PIN is valid, an e-purse manger in the portable device is activated and initiates a request (also referred to an over-the-air (OTA) top-up request) at 404. The MIDlet in the portable device sends a request to the e-purse applet at 406, which is illustrated in FIG. 4C where the e-purse manager MIDlet 434 communicates with the e-purse applet 436.

At 408, the e-purse applet composes a response in responding to the request from the MIDlet. Upon receiving the response, the MIDlet sends the response to a payment network and server over a cellular communications network. As shown in FIG. 4C, the e-purse manager MIDlet 434 communicates with the e-purse applet 436 for a response that is then sent to the payment network and server 440. At 410, the process 400 needs to verify the validity of the response. If the response cannot be verified, the process 400 stops. If the response can be verified, the process 400 moves to 412 where a corresponding account at a bank is verified. If the account does exist, a fund transfer request is initiated. At 414, the bank receives the request and responds to the request by returning a response. In general, the messages exchanged between the payment network and server and the bank are compliant with a network protocol (e.g., HTTP for the Internet).

At 416, the response from the bank is transported to the payment network and server. The MIDlet strips and extracts the APDU commands from the response and forwards the commands to the e-purse applet at 418. The e-purse applet verifies the commands at 420 and, provided they are authorized, sends the commands to the emulator at 420 and, meanwhile updating a transaction log. At 422, a ticket is generated to formulate a response (e.g., in APDU format) for the payment server. As a result, the payment server is updated with a successful status message for the MIDlet, where the APDU response is retained for subsequent verification at 424.

As shown in FIG. 4C, the payment network and server 440 receives a response from the e-purse manager MIDlet 434 and verifies that the response is from an authorized e-purse applet 436 originally issued therefrom with a SAM 444. After the response is verified, the payment network and server 440 sends a request to the financing bank 442 with which the user 432 is assumed to maintain an account. The bank will verify the request, authorize the request, and return an authorization number in some pre-arranged message format. Upon receiving the response from the bank 442, the payment server 440 will either reject the request or accept the request by forming a network response sent to the MIDlet 434.

The e-purse manager 434 verifies the authenticity (e.g., in APDU format) and sends commands to the emulator 438 and updates the transaction logs. By now, the e-purse applet 436 finishes the necessary steps and returns a response to the MIDlet 434 that forwards an (APDU) response in a network request to the payment server 440.

Although the process 400 is described as funding the e-purse. Those skilled in the art can appreciate that the process of making purchasing over a network with the e-purse is substantially similar to the process 400, accordingly no separate discussion on the process of making purchasing is provided.

Figure 5A:
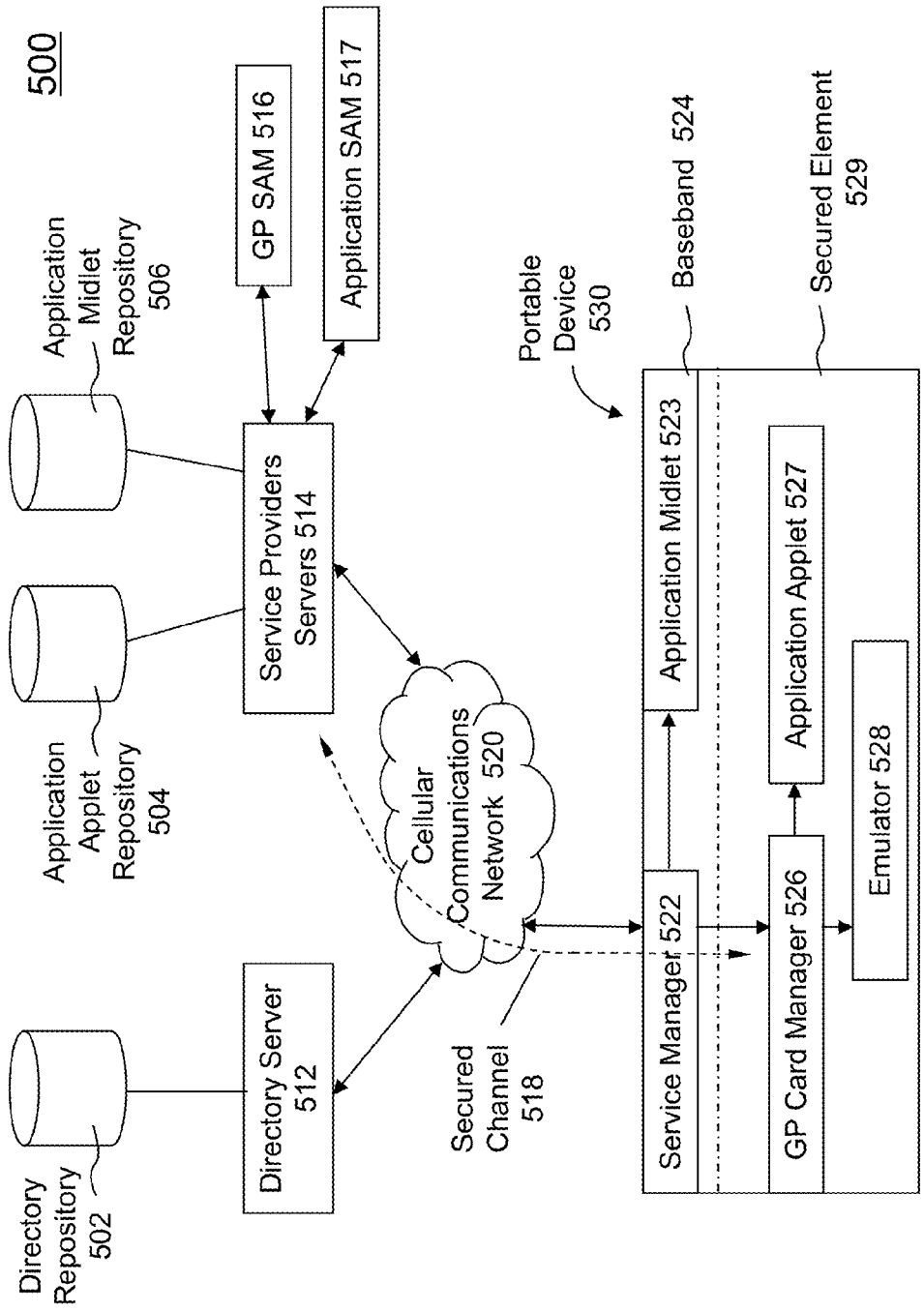
FIG. 5A is a diagram showing a first exemplary architecture of a portable device for enabling e-commerce and m-commerce functionalities over a cellular communications network (i.e., 3G, LTE or GPRS network), according an embodiment of the present invention.

Referring to FIG. 5A, there is shown a first exemplary architecture 500 of enabling a portable device 530 for e-commerce and m-commerce over a cellular communications network 520 (e.g., a GPRS network) in accordance with one embodiment of the present invention. The portable device 530 comprises a baseband 524 and a secured element 529 (e.g., a smart card). One example of such portable device is a Near Field Communication (NFC) enabled portable device (e.g., a cell mobile phone or a PDA). The baseband 524 provides an electronic platform or environment (e.g., a Java Micro Edition (JME), or Mobile Information Device Profile (MIDP)), on which an application MIDlet 523 and a service manager 522 can be executed or run. The secured element 529 contains a Global Platform (GP) card manager 526, an emulator 528 and other components such as PIN manager (not shown).

To enable the portable device 530 to conduct e-commerce and m-commerce, one or more services/applications need to be pre-installed and pre-configured thereon. An instance of a service manager 522 (e.g., a MIDlet with GUI) needs to be activated. In one embodiment, the service manager 522 is downloaded and installed. In another embodiment, the service manager 522 is preloaded. In any case, once the service manager 522 is activated, a list of directories for various services is shown. The items in the list may be related to the subscription by a user, and may also include items in promotion independent of the subscription by the user. The directory list may be received from a directory repository 502 of a directory server 512. The directory server 512 acts as a central hub (i.e., yellow page functions) for different service providers (e.g., an installation server, a personalization server) that may choose to offer products and/or services to subscribers. The yellow page functions of the directory server 512 may include service plan information (e.g., service charge, start date, end date, etc.), installation, personalization and/or MIDlet download locations (e.g., Internet addresses). The installation and personalization may be provided by two different business entities. For example, the installation is provided by an issuer of a secured element 529, while the personalization may be provided by a service provider who holds application transaction keys for a particular application.

According to one embodiment, the service manager 522 is configured to connect to one or more servers 514 (e.g., a TSM server) from a service provider(s) over the cellular communications network 520. It is assumed that the user has chosen one of the applications from the displayed directory. A secured channel 518 is established between the one or more servers 514 and the GP manager 526 to install/download an application applet 527 selected by the user and then to personalize the application applet 527 and optionally emulator 528, and finally to download an application MIDlet 523. The applet repository 504 and MIDlet repository 506 are the sources of generic application applets and application MIDlets, respectively. GP SAM 516 and application SAM 517 are used for creating the secured channel 518 for the personalization operations.

Figure 5B:
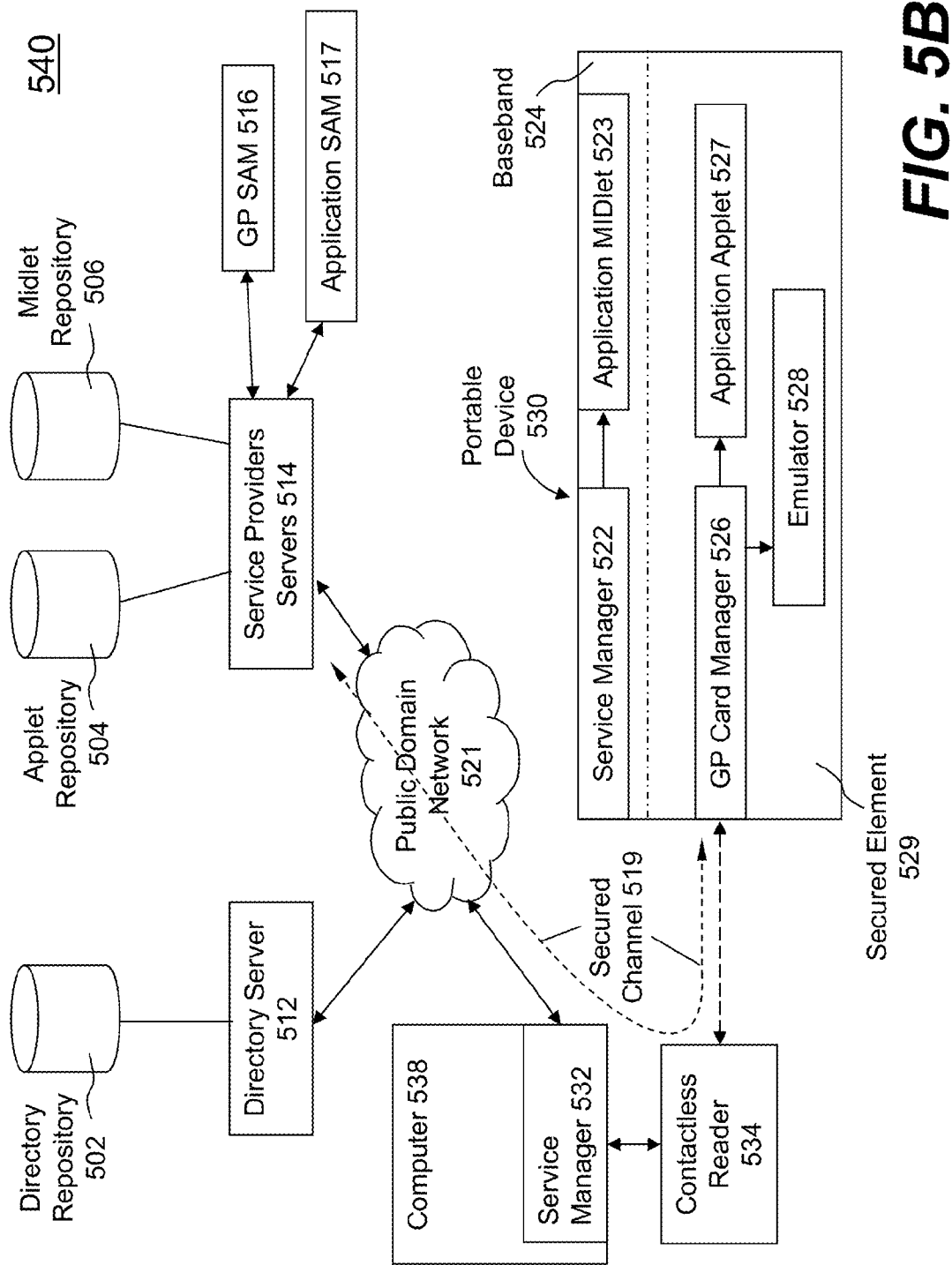
FIG. 5B is a diagram showing a second exemplary architecture of a portable device for enabling e-commerce and m-commerce functionalities over a wired and/or wireless data network (e.g., Internet), according another embodiment of the present invention.

FIG. 5B is a diagram showing a second exemplary architecture 540 of enabling a portable device 530 for e-commerce and m-commerce over a public network 521, according to another embodiment of the present invention. Most of the components of the second architecture 540 are substantially similar to those of the first architecture 500 of FIG. 5A. While the first architecture 500 is based on operations over a cellular communications network 520, the public network 521 (e.g., Internet) is used in the second architecture 540. The public network 521 may include a local area network (LAN), a wide area network (WAN), a Wi-Fi (IEEE 802.11) wireless link, a Wi-Max (IEEE 802.16) wireless link, etc. In order to conduct service operations over the public network 521, an instance of the service manager 532 (i.e., same or similar functionality of the service manager MIDlet 522) is installed on a computer 538, which is coupled to the public network 521. The computer 538 may be a desktop personal computer (PC), a laptop PC, or other computing devices that can execute the instance of the service manager 532 and be connected to the public network 521. The connection between the computer 538 and the portable device 530 is through a contactless reader 534. The service manager 532 acts as an agent to facilitate the installation and personalization between one or more servers 514 of a service provider and a GP card manager 526 via a secured channel 519.

Figure 5C:
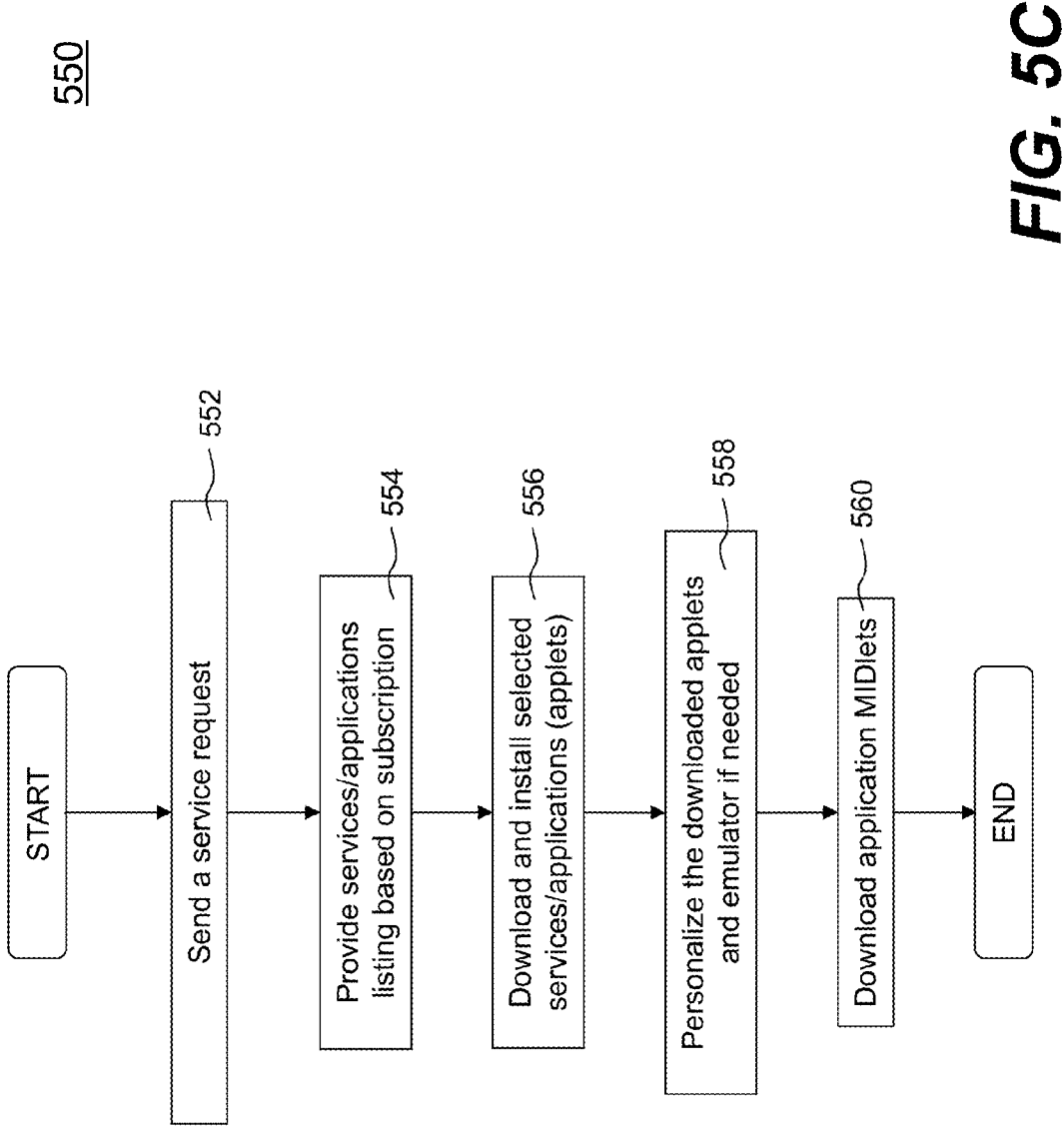
FIG. 5C is a flowchart illustrating an exemplary process of enabling the portable device of FIG. 5A for services/applications provided by one or more service providers in accordance with one embodiment of the present invention.

FIG. 5C is a flowchart illustrating a process 550 of enabling a portable device for e-commerce and m-commerce functionalities in accordance with one embodiment of the present invention. The process 550 may be implemented in software, hardware or a combination of both depending on implementation. To better understand the process 500, previous figures especially FIG. 5A and FIG. 5B are referred to in the following description.

Before the process 550 starts, an instance of a service manager 522 or 532 has been downloaded or pre-installed on either the portable device 530 or a computer 538. At 552, the service manager is activated and sends a service request to the server 514 at a service provider. Next after the authentication of a user and the portable device has been verified, at 554, the process 550 provides a directory list of services/applications based on subscription of the user of the portable device 530. For example, the list may contain a mobile POS application, an e-purse application, an e-ticketing application, and other commercially offered services. Then one of the services/applications is chosen from the directory list. For example, an e-purse or a mobile-POS may be chosen to configure the portable device 530. Responding to the user selection, the process 550 downloads and installs the selected services/applications at 556. For example, e-purse applet (i.e., application applet 527) is downloaded from the applet repository 504 and installed onto a secured element 529. The path for downloading or installation may be either via a secured channel 518 or 519. At 558, the process 550 personalizes the downloaded application applet and the emulator 528 if needed. Some of the downloaded application applets do not need to be personalized and some do. In one embodiment, a mobile POS application applet ("POS SAM") needs to be personalized, and the following information or data array has to be provided:

a unique SAM ID based on the unique identifier of the underlying secured element;
a set of debit master keys;
a transformed message encryption key;
a transformed message authentication key;
a maximum length of remark for each offline transaction;
a transformed batch transaction key; and
a GP PIN.

In another embodiment, personalization of an e-purse applet for a single functional card not only needs to configure specific data (i.e., PINs, transformed keys, start date, end date, etc.) onto the e-purse, but also needs to configure the emulator to be operable in an open system. Finally, at 560, the process 550 downloads and optionally launches the application MIDlet 523. Some of the personalized data from the application applet may be accessed and displayed or provided from the user. The process 550 ends when all of the components of services/applications have been installed, personalized and downloaded.

According to one embodiment, an exemplary process of enabling a portable device 530 as a mobile POS is listed as follows:

connecting to an installation server (i.e., one of the service provider server 514) to request the server to establish a first security channel (e.g., the secured channel 518) from an issuer domain (i.e., applet repository 504) to the GP card manager 526 residing in a secured element 529;

receiving one or more network messages including APDU requests that envelop a POS SAM applet (e.g., a Java Cap file from the applet repository 504);

extracting the APDU requests from the received network messages;

sending the extracted APDU requests to the GP card manager 526 in a correct order for installation of the POS SAM (i.e., application applet 527) onto the secured element 529;

connecting to a personalization server (i.e., one of the service provider servers 514) for a second security channel (may or may not be the secured channel 518 depending on the server and/or the path) between the personalization server and the newly downloaded applet (i.e., POS SAM);

receiving one or more network messages for one or more separated 'STORE DATA APDU'; and extracting and sending the 'STORE DATA APDU' to personalize POS SAM; and downloading and launching POS manager (i.e., application MIDlet 523).

Figure 6A:
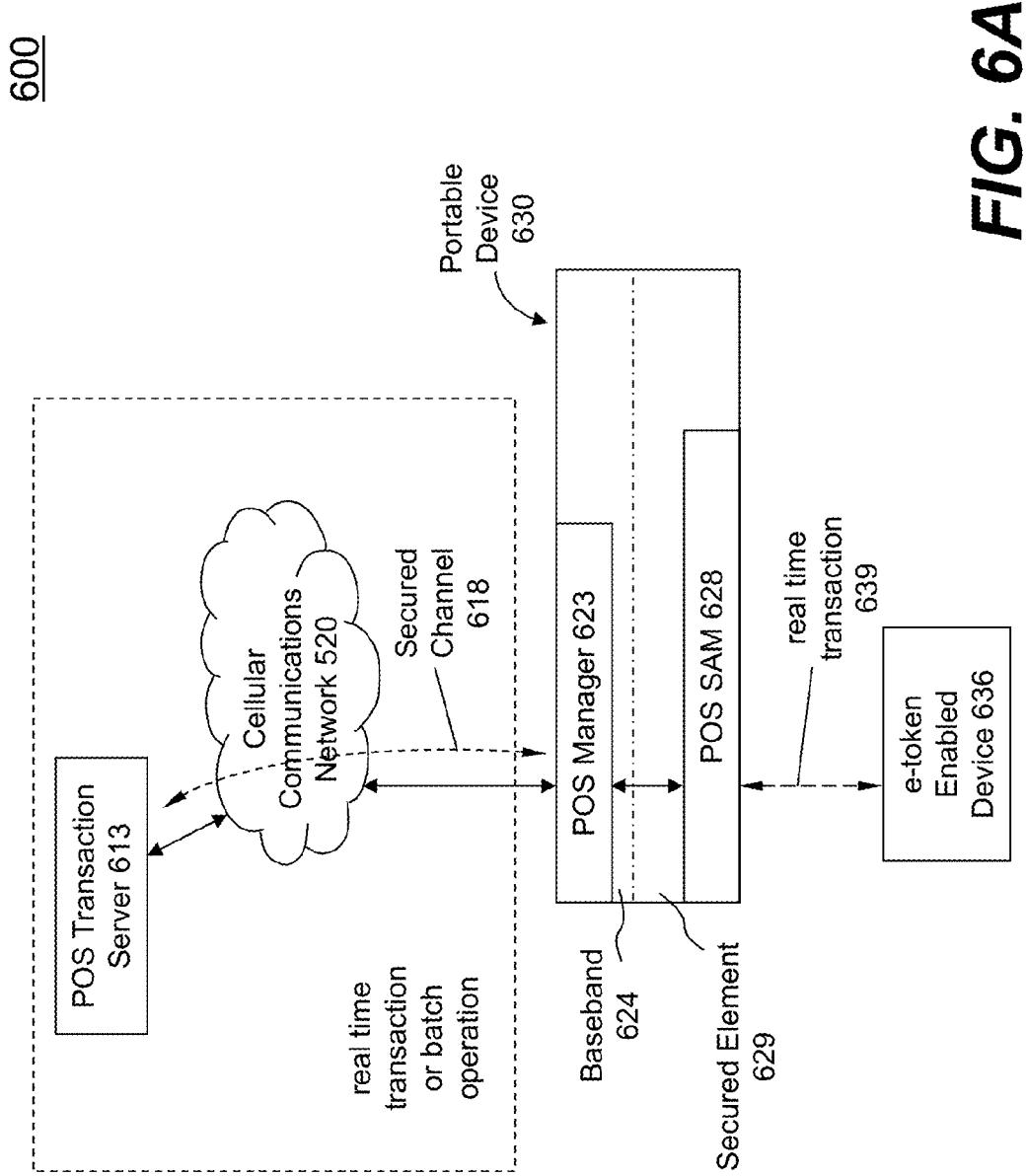
FIG. 6A is a diagram showing an exemplary architecture, in which a portable device is enabled as a mobile POS conducting e-commerce and m-commerce, according to one embodiment of the present invention.

Referring to FIG. 6A, there is shown an exemplary architecture 600, in which a portable device 630 is enabled as a mobile POS to conduct e-commerce and m-commerce, according to one embodiment of the present invention. The portable device 630 comprises a baseband 624 and a secured element 629. A POS manager 623 is downloaded and installed in the baseband 623 and a POS SAM 628 is installed and personalized in the secured element 629 to enable the portable device 630 to act as a mobile POS. Then a real time transaction 639 can be conducted between the mobile POS enabled portable device 630 and an e-token enabled device 636 (e.g., a single functional card or a portable device enabled with an e-purse). The e-token may represent e-money, e-coupon, e-ticket, e-voucher or any other forms of payment tokens in a device.

The real time transaction 639 can be conducted offline (i.e., without the portable device connecting to a backend POS transaction server 613). However, the portable device 630 may connect to the backend POS transaction servers 613 over the cellular network 520 in certain instances, for example, the amount of the transaction is over a pre-defined threshold or limit, the e-token enabled device 636 needs a top-up or virtual top-up, transactional upload (single or in batch).

Records of accumulated offline transactions need to be uploaded to the backend POS transaction server 613 for settlement. The upload operations are conducted with the portable device 630 connecting to the POS transaction server 613 via a secured channel 618. Similar to the installation and personalization procedures, the upload operations can be conducted in two different routes: the cellular communications network 520; or the public network 521. The first route has been described and illustrated in FIG. 6A.

Figure 6B:
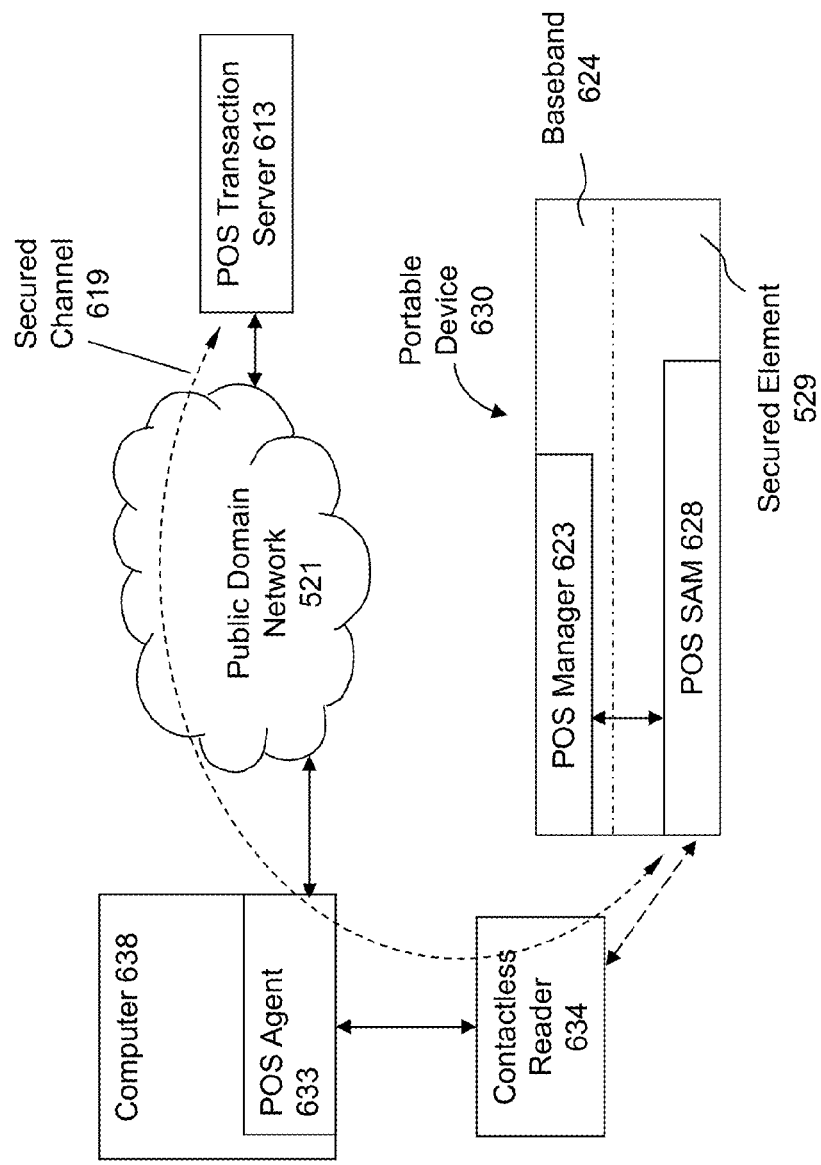
FIG. 6B is a diagram showing an exemplary architecture, in which a portable device is enabled as a mobile POS conducting a transaction upload operation over a network, according to an embodiment of the present invention.

The second route is illustrated in FIG. 6B showing an exemplary architecture 640, in which a portable device 630 is enabled as a mobile POS conducting a transaction upload in batch operation over a public network 521, according to an embodiment of the present invention. Records of offline transactions in the mobile POS are generally kept and accumulated in a transaction log in the POS SAM 628. The transaction log are read by a contactless reader 634 into a POS agent 633 installed on a computer 638. The POS agent 633 then connects to a POS transaction server 613 over the public network 521 via a secured channel 619. Each of the upload operations is marked as a different batch, which includes one or more transaction records. Data communication between the POS SAM 628, the contactless reader 634 and the POS agent 632 in APDU containing the transaction records. Network messages that envelop the APDU (e.g., HTTP) are used between the POS agent 632 and the POS transaction server 613.

In one embodiment, an exemplary batch upload process from the POS manager 623 or the POS agent 633 includes:
  sending a request to the POS SAM 628 to initiate a batch upload operation;
  retrieving accumulated transaction records in form of APDU commands from a marked "batch" or "group" in the POS SAM 628 when the POS SAM 628 accepts the batch upload request;
  forming one or more network messages containing the retrieved APDU commands;
  sending the one or more network messages to the POS transaction server 613 via a secured channel 619;
  receiving a acknowledgement signature from the POS transaction server 613;
  forwarding the acknowledgement signature in form APDU to the POS SAM 628 for verification and then deletion of the confirmed uploaded transaction records; and
  repeating the step b) to step f) if there are additional un-uploaded transaction records still in the same "batch" or "group".

Figure 6C:
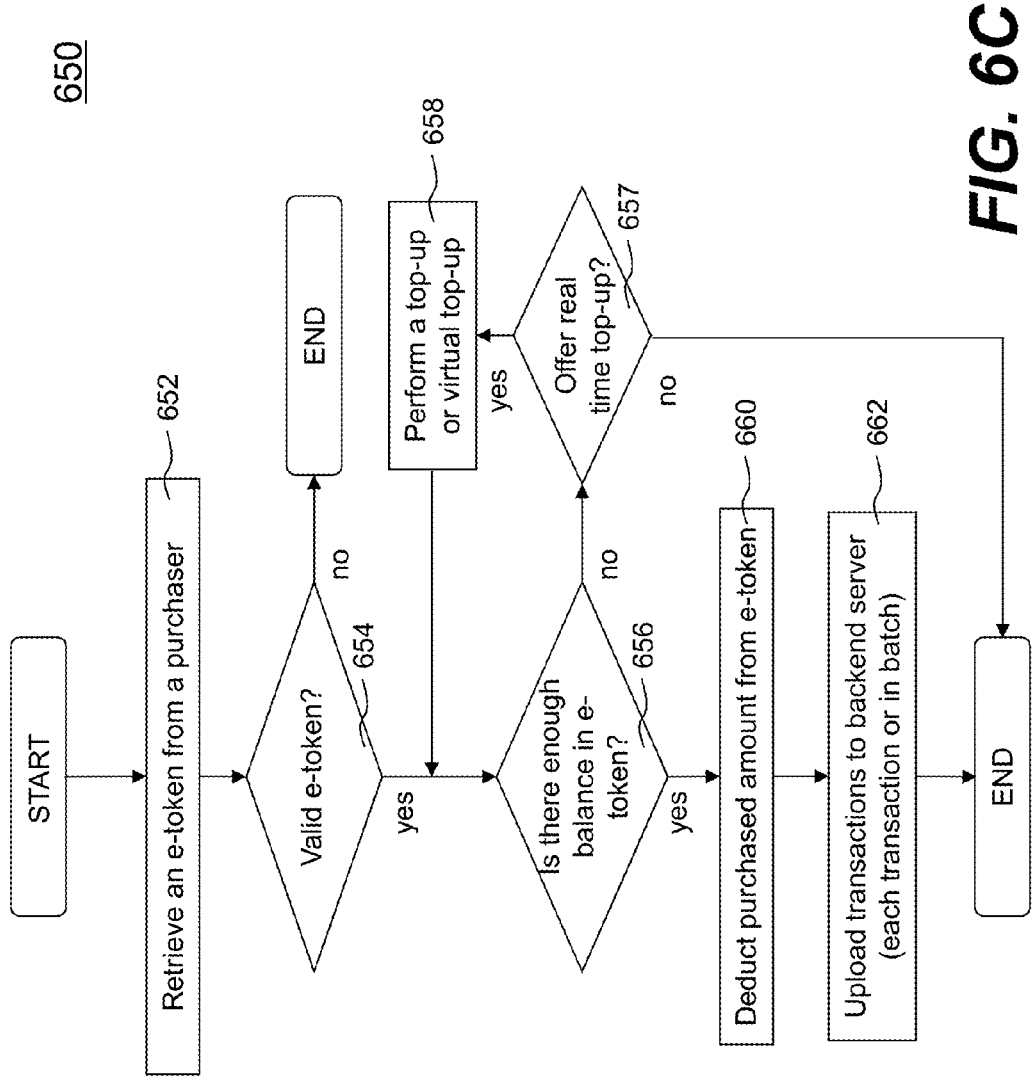
FIG. 6C is a flowchart illustrating an exemplary process of conducting m-commerce using the portable device enabled as a mobile POS with an e-token enabled device as a single functional card in accordance with one embodiment of the present invention.

Referring to FIG. 6C, there is shown a flowchart illustrating a process 650 of conducting m-commerce using the portable device 630 enabled to act as a mobile POS with an e-token enabled device 636 as a single functional card in accordance with one embodiment of the present invention. The process 650, which is preferably understood in conjunction with the previous figures especially FIG. 6A and FIG. 6B, may be implemented in software, hardware or a combination of both.

The process 650 (e.g., a process performed by the POS manager 623 of FIG. 6A) starts when a holder of an e-token enabled device (e.g., a Mifare card or an e-purse enabled cell phone emulating single functional card) desires to make a purchase or order a service with the mobile POS (i.e., the portable device 630). At 652, the portable device 630 retrieving an e-token (e.g., tag ID of Mifare card) by reading the e-token enabled device. Next, the process 650 verifies whether the retrieved e-token is valid at 654. If the e-token enabled device 636 of FIG. 6A is a single functional card (e.g., Mifare), the verification procedure performed by the POS manager 623 includes: i) reading the card identity (ID) of the card stored on an area that is unprotected or protected by a well-known key; ii) sending an APDU request containing the card ID to the POS SAM 628; iii) and receiving one or more transformed keys (e.g., for transaction counter, an issuer data, etc.) generated by the POS SAM 628. If the one or more received transformed keys are not valid, that is, the retrieved e-token being not valid, then the process 650 ends. Otherwise, the process 650 following the "yes" branch to 656, in which it is determined whether there is enough balance in the retrieved e-token to cover the cost of the current transaction. If the result is "no" at 656, the process 650 may optionally offer the holder to top-up (i.e., load, fund, finance) the e-token at 657. If "no", the process 650 ends. Otherwise if the holder agrees to a real time top-up of the e-token enabled device, the process 650 performs either a top-up or a virtual top-up operation at 658. Then the process 650 goes back to 656. Whereas there is enough balance in the e-token, the process 650 deducts or debits the purchase amount from the e-token of the e-token enabled device 636 at 660. In the single functional card case, the one or more transformed keys are used to authorize the deduction. Finally at 662, records of one or more offline transactions accumulated in the POS SAM 628 are uploaded to the POS transaction server 613 for settlement. The upload operations may be conducted for each transaction or in batch over either the cellular communications network 520 or the public domain network 521.

The top-up operations have been described and shown in the process 400 of FIG. 4A. A virtual top-up operation is a special operation of the top-up operation and typically is used to credit an e-token by a sponsor or donor. To enable a virtual top-up operation, the sponsor needs to set up an account that ties to an e-token enabled device (e.g., a single functional card, a multi-functional card, an e-token enable cell phone, etc.). For example, an online account is offered by a commercial entity (e.g., business, bank, etc.). Once the sponsor has funded the e-token to the online account, the holder of the e-token enabled device is able to receive an e-token from the online account when connecting to the mobile POS. Various security measures are implemented to ensure the virtual top-up operation is secure and reliable. One exemplary usage of the virtual top-up is that a parent (i.e., a sponsor) can fund an e-token via an online account, which is linked to a cell phone (i.e., an e-token enabled device) of a child (i.e., the holder), such that the child may receive the funded e-token while the child makes a purchase at a mobile POS. In addition to various e-commerce and m-commerce functionalities described herein, the POS manager 623 is configured to provide various query operations, for example, a) checking the un-batched (i.e., not uploaded) balance accumulated in the POS SAM, b) listing the un-batched transaction log in the POS SAM, c) viewing details of a particular transaction stored in the POS SAM, d) checking the current balance of an e-token enabled device, e) listing a transaction log of the e-token enabled device, and f) viewing details of a particular transaction of the e-token enabled device.

Figure 6D:
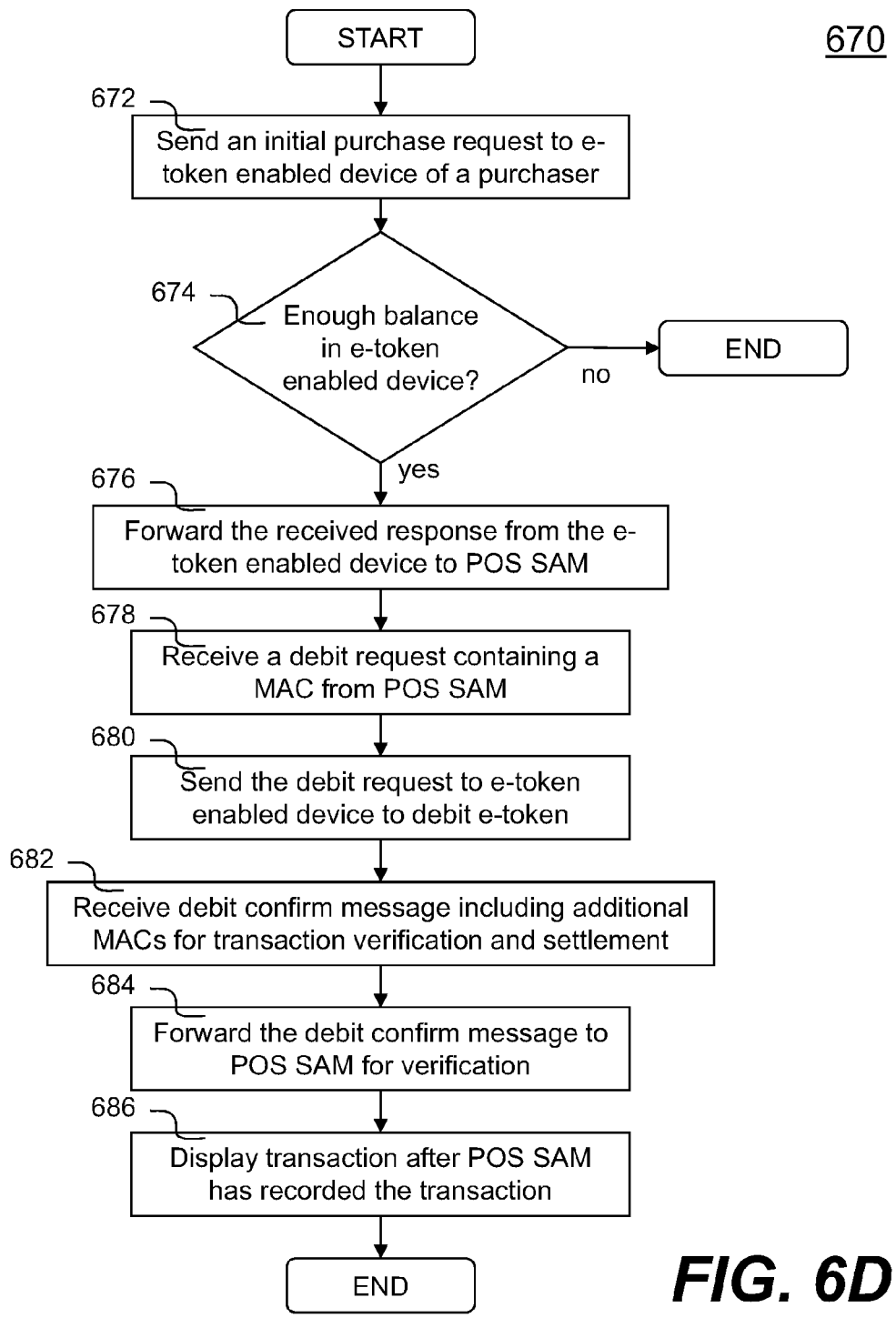
FIG. 6D is a flowchart illustrating an exemplary process of conducting m-commerce using the portable device enabled as a mobile POS against a an e-token enabled device as a multi-functional card.

Referring to FIG. 6D, there is shown a flowchart illustrating an exemplary process 670 of conducting m-commerce using the portable device 630 enabled to act as a mobile POS with an e-token enabled device 636 as a multi-functional card in accordance with one embodiment of the present invention. The process 670, which is preferably understood in conjunction with the previous figures especially FIG. 6A and FIG. 6B, may be implemented in software, hardware or a combination of both.

The process 670 (e.g., a process performed by the POS manager 623 of FIG. 6A) starts when a holder of an e-token enabled device 636 (e.g., a multi-functional card or an e-purse enabled cell phone emulating a multi-functional card) desires to make a purchase or order a service with the mobile POS (i.e., the portable device 630). At 672, the process 670 sends an initial purchase request to the e-token enabled device 636. The purchase amount is sent along with the initial request (e.g., APDU commands). Next the process 670 moves to decision 674. When there is not enough balance in the e-token enabled device 636. The initial purchase request will be turned down as a return message received at the POS manager 623. As a result, the process 670 ends with the purchase request being denied. If there is enough balance in the e-token enabled device 636, the result of the decision 674 is "yes" and the process 670 follows the "yes" branch to 676. The received response (e.g., APDU commands) from the e-token enabled device 636 is forwarded to the POS SAM 628. The response comprises information such as the version of the e-token key and a random number to be used for establishing a secured channel between the applet (e.g., e-purse applet) resided on the e-token enabled device 636 and the POS SAM 628 installed on the portable device 630. Then, at 678, the process 670 receives a debit request (e.g., APDU commands) generated by the POS SAM 628 in response to the forwarded response (i.e., the response at 676). The debit request contains a Message Authentication Code (MAC) for the applet (i.e., e-purse applet) to verify the upcoming debit operation, which is performed in response to the debit request sent at 680. The process 670 moves to 682 in which a confirmation message for the debit operation is received. In the confirmation message, there are additional MACs, which are used for verification and settlement by the POS SAM 628 and the POS transaction server 613, respectively. Next at 684, the debit confirmation message is forwarded to the POS SAM 628 for verification. Once the MAC is verified and the purchase transaction is recorded in the POS SAM 628, the recorded transaction is displayed at 686 before the process 670 ends. It is noted that the e-commerce transaction described may be carried out offline or online with the POS transaction server 613. Also when there is not enough balance in the e-token enabled device, a top-up or funding operation may be performed using the process 400 illustrated in FIG. 4A and FIG. 4B.

Figure 7:
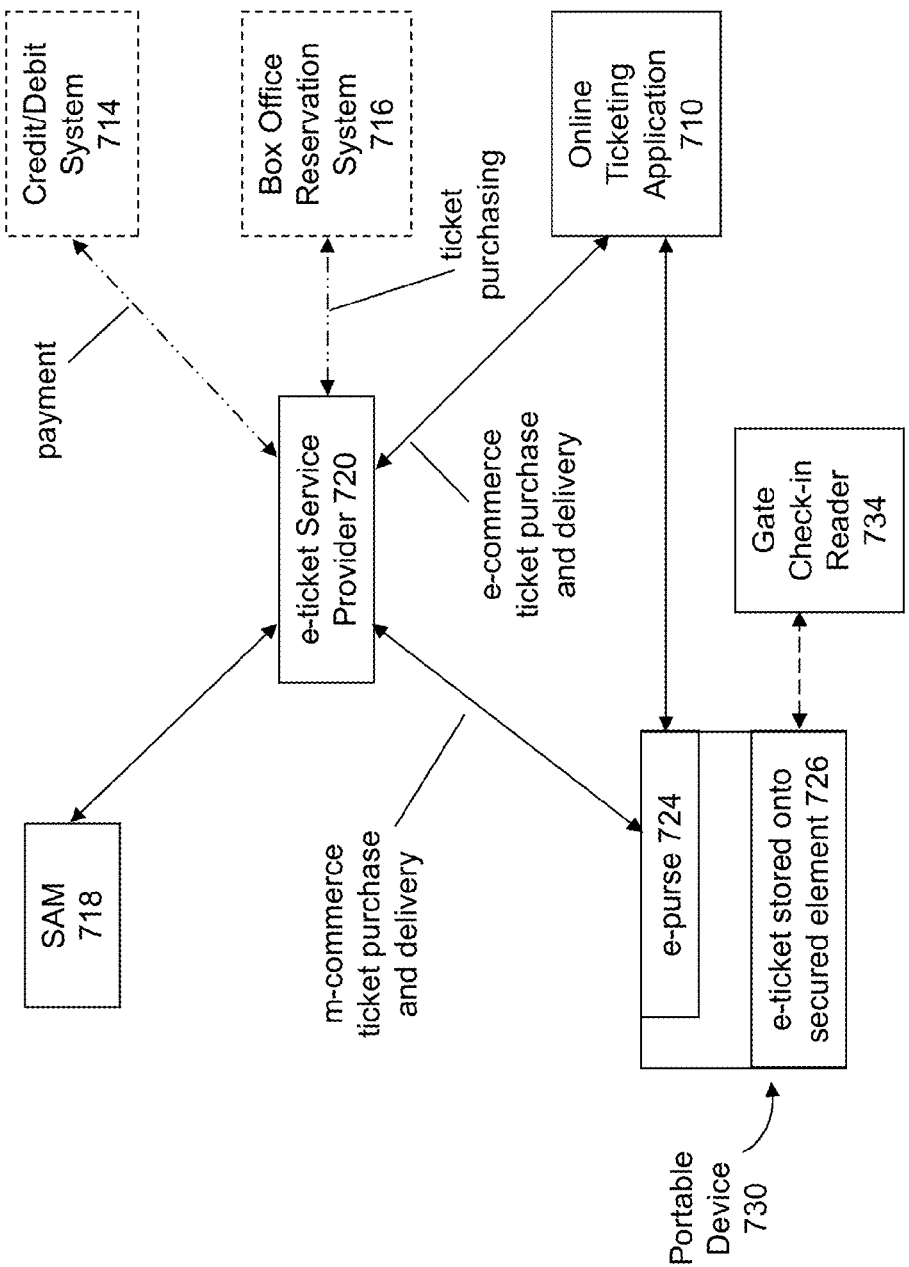
FIG. 7 is a diagram depicting an exemplary configuration in which a portable device used for an e-ticking application.

FIG. 7 shows an exemplary configuration in which a portable device is used for an e-ticketing application. A portable device 730 is configured to include an e-purse 724. When an owner or holder of the portable device 730 desires to purchase a ticket for a particular event (e.g., a concert ticket, a ballgame ticket, etc.), the owner can use e-purse 724 to purchase a ticket through an e-ticket service provider 720. The e-ticket service provider 720 may contact a traditional box office reservation system 716 or an online ticketing application 710 for ticket reservation and purchase. Then e-token (e.g., e-money) is deducted from the e-purse 724 of the portable device 730 to pay the ticket purchase to a credit/debit system 714 (e.g., a financial institute, a bank). A SAM 718 is connected to the e-ticket service provider 720 so that the authentication of e-purse 724 in the portable device 730 can be assured. Upon a confirmation of the payment is received, the e-ticket is delivered to the portable device 730 over the air (e.g., a cellular communications network) and stored onto a secured element 726 electronically, for example, an e-ticket code or key or password. Later on, when the owner of the portable device 730, the ticket holder, attends the particular event, the owner needs only to let a gate check-in reader 734 to read the stored e-ticket code or key in the portable device 730. In one embodiment, the gate check-in reader 734 is a contactless reader (e.g., an ISO 14443 complied proximity coupling device). The portable device 730 is a NFC capable mobile phone.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

What we claim is:

1. A mobile device for conducting a secured transaction over a network, the mobile device comprising:
    a contactless interface to allow the mobile device to communicate with another device in near field communication without physical contact therebetween, wherein the another device is coupled to a data network;
    a secure element, coupled to the contactless interface, hosting parameters to cause a module in the mobile device to function as an electronic wallet, wherein the secure element has been personalized with a designated server by installing therein a first data set including keys generated in the designated server, and the module has been provisioned to work only with the secure element;
  a memory space for storing at least the module and an application downloaded from the data network; and
  a processor, coupled to the memory space, configured to execute the module to perform operations including:
    establishing a first secured channel between the mobile device and a payment network using one or more of the keys in the secure element to conduct securely a first transaction using the application, wherein the module is activated by the application to conduct first data exchanges with the payment network without going through the contactless interface;
    sending second data set to the another device in near field communication via the contactless interface, wherein the second data set includes a response to a request from the another device, the second data set is related to the first data set in the secure element, the module subsequently conducts a second transaction in conjunction with the secure element to facilitate second data exchanges between the another device and the payment network over a second secured channel.

2. The mobile device as recited in claim 1, wherein, the keys are specifically generated in the designated server for the secure element based on device information of the secure element retrieved from the mobile device over a secured channel established per default keys preloaded in the secure element.

3. The mobile device as recited in claim 2, wherein the secure element controls operations of the module, in responding to an instruction from the designated server, to disable or enable the operations of the module and wherein the response in the second data set is in Application Protocol Data Unit (APDU).

4. The mobile device as recited in claim 1, wherein the first transaction and the second transaction are conducted respectively depending on how a user desires to conduct a transaction with the mobile device.

5. The mobile device as recited in claim 1, wherein the secure element is personalized with the designated server in conjunction with a provider of the application already downloaded in the mobile device, to authenticate the first or second transaction using the application.

6. The mobile device as recited in claim 5, wherein the operations further include:
  sending a set of initial data to the payment network via the designated server over a communication network for verification of a corresponding account; and
  receiving an authorization number in a pre-arranged message format after the corresponding account is verified, wherein the authorization number is included in the first data set from the designated server and associated with the secure element.

7. The mobile device as recited in claim 6, wherein the secure element is identified by device information of the secure element, the device information retrieved by the designated server is used to generate the keys for the secure element.

8. The mobile device as recited in claim 7, wherein the device information includes an identifier of the secure element, manufacturer information and a batch number.

9. The mobile device as recited in claim 1, wherein the secure element has a set of default keys initially, the set of default keys is used to securely receive the keys generated in the designated server for the secure element and subsequently is replaced by the received keys from the designated server.

10. The mobile device as recited in claim 1, wherein the mobile device is configured to maintain a transaction log including all transactions through or without going through the contactless interface.

11. A method for a mobile device to conduct a secured transaction over a network, the method comprising:
  providing a near field communication interface in the mobile device to allow the mobile device to communicate with another device without physical contact therebetween, wherein the another device is coupled to a data network;
  providing a secure element in the mobile device, the secure element, coupled to the interface, hosting parameters to enable a module in the mobile device to function as an electronic wallet, wherein the secure element has been personalized with a designated server by installing therein a first data set including keys specifically generated in the designated server therefor, and the module has been provisioned with the secure element;
  storing in a memory space at least the module and an application downloaded from the data network;
  causing a processor to execute the module to perform operations including:
    establishing a first secured channel between the mobile device and a payment network using one or more of the keys in the secure element to conduct securely a first transaction using the application, wherein the module is activated by the application to conduct first data exchanges with the payment network without going through the near field communication interface; and
    sending a second data set to the another device via the near field communication interface, wherein the second data set includes a response to a request from the another device, the second data set is related to the first data set in the secure element, the module subsequently conducts a second transaction in conjunction with the secure element to facilitate second data exchanges between the another device and the payment network over a second secured channel.

12. The method as recited in claim 11, wherein the keys are specifically generated in the designated server for the secure element based on device information of the secure element retrieved from the mobile device over a secured channel established per default keys preloaded in the secure element.

13. The method as recited in claim 12, wherein the secure element controls operations of the module, in responding to an instruction from the designated server, to disable or enable the operations of the module and wherein the response in the second data set is in Application Protocol Data Unit (APDU).

14. The method as recited in claim 11, wherein the first transaction and the second transaction are conducted respectively depending on how a user desires to conduct a transaction with the mobile device.

15. The method as recited in claim 11, wherein the secure element is personalized with the designated server in conjunction with a provider of the application already downloaded in the mobile device to authenticate the first or second transaction via the application.

16. The method as recited in claim 15, wherein the operations further include:

sending a set of initial data to the payment network via the designated server over a communication network for verification of a corresponding account; and receiving an authorization number in a pre-arranged message format after the corresponding account is verified, wherein the authorization number is included in the first data set from the designated server and is specifically associated with the secure element.

17. The method as recited in claim 11, wherein the secure element is identified by device information of the secure element, the device information retrieved by the designated server is used to generate the keys for the secure element.

18. The method as recited in claim 17, wherein the device information includes an identifier of the secure element, manufacturer information and a batch number.

19. The method as recited in claim 18, wherein the secure element has a set of default keys initially, the set of default keys is used to securely receive the keys generated in the designated server for the secure element and subsequently is replaced by the received keys from the designated server.

20. The method as recited in claim 11, further comprising: maintaining a transaction log in the mobile device including all transactions through or without going through the near field communication interface.

* * * * *